United States Patent
Jiang

(10) Patent No.: US 11,943,148 B2
(45) Date of Patent: Mar. 26, 2024

(54) TRAFFIC FLOW PROCESSING METHOD AND APPARATUS

(71) Applicant: HUAWEI TECHNOLOGIES CO., LTD., Guangdong (CN)

(72) Inventor: Yuanlong Jiang, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 394 days.

(21) Appl. No.: 17/243,673

(22) Filed: Apr. 29, 2021

(65) Prior Publication Data

US 2021/0250303 A1    Aug. 12, 2021

Related U.S. Application Data

(63) Continuation of application No. PCT/CN2019/113506, filed on Oct. 28, 2019.

(30) Foreign Application Priority Data

Oct. 31, 2018  (CN) .......................... 201811290209.0

(51) Int. Cl.
*H04L 47/32* (2022.01)
*H04L 45/24* (2022.01)
(Continued)

(52) U.S. Cl.
CPC .............. *H04L 47/32* (2013.01); *H04L 45/24* (2013.01); *H04L 45/507* (2013.01); *H04L 47/17* (2013.01)

(58) Field of Classification Search
CPC ....... H04L 47/32; H04L 45/24; H04L 45/507; H04L 47/17; H04L 41/0813;
(Continued)

(56) References Cited

U.S. PATENT DOCUMENTS

2005/0207407 A1    9/2005  Baumberger
2016/0226769 A1*   8/2016  McCormick ............ H04L 47/34
2016/0308696 A1    10/2016 Nishimura

FOREIGN PATENT DOCUMENTS

CN    101019382 A    8/2007
CN    101902353 A    12/2010
(Continued)

OTHER PUBLICATIONS

Deterministic Networking Architecture draft-ietf-detnet-architecture-06, Finn et al. Jun. 2018 (Year: 2018).*
(Continued)

*Primary Examiner* — Rina C Pancholi

(57) ABSTRACT

Embodiments of this application provide a traffic flow processing method. The method includes: generating and configuring first configuration information for a first edge node and second configuration information for the first relay node, where the first configuration information is used to: replicate a data packet included in a received traffic flow to obtain a first data packet and a second data packet, output, to a first relay node, the obtained first data packet, and output, to a second relay node, the obtained second data packet; generating and configuring second configuration information for the first relay node, where the second configuration information is used to: replicate the first data packet to obtain a third data packet and a fourth data packet, output, to the second relay node, the obtained third data packet, and obtain and output a first received data packet between the obtained fourth data packet and a fifth data packet received from the second relay node.

16 Claims, 8 Drawing Sheets

(51) Int. Cl.
  *H04L 45/50* (2022.01)
  *H04L 47/17* (2022.01)
(58) Field of Classification Search
  CPC ....... H04L 41/085; H04L 45/28; H04L 45/42; H04L 45/50; H04L 47/34; H04L 45/74
  See application file for complete search history.

(56) References Cited

FOREIGN PATENT DOCUMENTS

| | | |
|---|---|---|
| CN | 102083147 A | 6/2011 |
| CN | 102594649 A | 7/2012 |
| CN | 106550291 A | 3/2017 |
| CN | 106792969 A | 5/2017 |
| CN | 106992874 A | 7/2017 |
| CN | 108462591 A | 8/2018 |
| CN | 108462591 B | 4/2020 |
| KR | 20030089717 A | 11/2003 |

OTHER PUBLICATIONS

X. Geng et al, DetNet Configuration Yang Model, draft-geng-detnet-conf-yang-03, Network Working Group, Jul. 16, 2018, total 42 pages.

N. Finn et al, Deterministic Networking Architecture, draft-ietf-detnet-architecture-06, DetNet Internet-Draft, Jun. 28, 2018, total 40 pages.

J. Korhonen, Ed et al, DetNet Data Plane Encapsulation, draft-ietf-detnet-dp-sol-04, DetNet Internet-Draft, total 39 pages.

J. Korhonen, Ed et al, DetNet MPLS Data Plane Encapsulation, draft-ietf-detnet-dp-sol-mpls-00, DetNet Internet-Draft, Jun. 30, 2018, total 46 pages.

Request for Comments: 6020, M. Bjorklund, Ed. et al, Yang—A Data Modeling Language for the Network Configuration Protocol (NETCONF), Internet Engineering Task Force (IETF), Oct. 2010, total 173 pages.

Xiong Xiaofu et al, Routing Selection for Wide-area Protection Based on Communication Reliability and Time-delay Requirement, Automation of Electric Power Systems, vol. 35, No. 3, Feb. 10, 2011, With an English Abstract, total 5 pages.

Office Action issued in CN 201811290209.0 dated Nov. 24, 2020, 6 pages.

International Search Report and Written Opinion issued in PCT/CN2019/113506, dated Jan. 17, 2020, 10 pages.

N. Finn et al., "Deterministic Networking Architecture draft-ietf-detnet-architecture-09", Oct. 22, 2018, total: 42 pages.

Korhonen J et al: DetNet MPLS Data Plane Encapsulation;draft ietf detnet dp sol mpls 01.txt, Geneva Switzerland, No. 1, Oct. 21, 2018, pp. 1-50, XP015129346 [retrieved on Oct. 22, 2018], total: 50 pages.

Extended European Search Report issued in EP19877762.5, dated Nov. 17, 2021, 15 pages.

Notice of Allowance issued in KR10-2021-7015150, dated Jun. 9, 2023 with English Translation, 7 pages.

* cited by examiner

TRAFFIC FLOW PROCESSING METHOD AND APPARATUS

CROSS-REFERENCE TO RELATED APPLICATIONS

This application is a continuation of International Application No. PCT/CN2019/113506, filed on Oct. 28, 2019, which claims priority to Chinese Patent Application No. 201811290209.0, filed on Oct. 31, 2018. The disclosures of the aforementioned applications are hereby incorporated by reference in their entireties.

TECHNICAL FIELD

This application relates to the field of communications technologies, and in particular, to a traffic flow processing method and apparatus.

BACKGROUND

With development of communications networks, reliability of transmission of a traffic flow needs to be considered as well as reachability. Currently, a high-reliability network architecture for transmission of a traffic flow may typically include an edge node and a relay node. The edge node is connected to a source node and/or a destination node of the traffic flow, and receives a traffic flow from the source node of the traffic flow and/or sends the traffic flow to the destination node of the traffic flow. The relay node is a node through which the traffic flow passes during transmission of the traffic flow from the source node to the destination node. A path from the source node to the destination node includes one or more path segments, and the relay node is configured to connect neighboring path segments together, to ensure reachability of the traffic flow. There may be a plurality of paths from the source node to the destination node, so as to implement service protection. The traffic flow is transmitted on a plurality of paths simultaneously, and the destination node can successfully receive the traffic flow provided that one path is not faulty. This ensures reliability of transmission of the traffic flow.

Therefore, the key to traffic flow transmission lies in how to configure each node for traffic flow transmission and protection.

SUMMARY

Embodiments of this application provide a traffic flow processing method and apparatus for traffic flow transmission and protection.

According to a first aspect, an embodiment of this application provides a traffic flow processing method. The method may be applied to a controller. The controller may be independent of the following nodes, or may be deployed on one of the following nodes, for example, a first edge node. Specifically, the method includes the following steps: generating and configuring first configuration information for the first edge node, generating and configuring second configuration information for a first relay node, and generating and configuring third configuration information for a second edge node. The first edge node may be a source node, the second edge node may be a destination node, and the first relay node is on a link between the first edge node and the second edge node. The first configuration information is used to: replicate a data packet included in a traffic flow received by the first edge node; output, to the first relay node, a first data packet obtained through replication; and output, to a second relay node, a second data packet obtained through replication. The second configuration information is used to: replicate the first data packet by the first relay node; output, to the second relay node, a third data packet obtained through replication; and obtain and output a first received data packet between a fourth data packet obtained through replication and a fifth data packet from the second relay node. The third configuration information is used to obtain a data packet in a data packet from the first relay node and a data packet from the second relay node. The second relay node is not on a link from the first edge node to the second edge node through the first relay node. In this embodiment, the first configuration information is generated and configured for the first edge node, the second configuration information is generated and configured for the first relay node, and the third configuration information is generated and configured for the second edge node, to protect and output a traffic flow.

The first edge node may receive a traffic flow from a first customer edge (CE) node through an attachment circuit (AC). The traffic flow may include one or more data packets. To distinguish between a plurality of data packets included in the traffic flow, the first edge node may allocate a sequence number to each data packet, and continuity of the sequence numbers of the data packets reflects continuity of content of the data packets. For example, a data packet 1 indicates a $1^{st}$ data packet (an initial data packet) in a traffic flow, a data packet 2 indicates a $2^{nd}$ data packet in the traffic flow, and a packet 3 indicates a 3' packet in the traffic flow.

In actual application, a replication module may perform the step of replication, and an elimination module may perform the foregoing step of obtaining a data packet.

When replicating data packets in the traffic flow, a replication module of the first edge node may replicate the data packets one by one in ascending order or descending order of sequence numbers. When replicating received data packets, a replication module of the first relay node or a replication module of another relay node hereinafter may replicate the data packets one by one based on a receiving order of the data packets. After a data packet is replicated, content and a sequence number of a data packet obtained through replication are respectively the same as content and a sequence number of the replicated data packet.

An elimination module of the first relay node, an elimination module of the second edge node, or an elimination module of another relay node hereinafter may obtain a data packet in two cases. In one case, if the elimination module obtains at least two data packets with a same sequence number, the elimination module may select one of the data packets for outputting. In another case, if the elimination module receives only one data packet with a specific sequence number due to packet loss during transmission of data packets, the elimination module may send the data packet. In the former case, if the elimination module successively receives at least two data packets with a same sequence number, the elimination module may output a first received data packet; or if the elimination module synchronously receives at least two data packets with a same sequence number, the elimination module may select any one of the data packets for outputting.

In an embodiment, an indication flag may be set for each data packet on the elimination module, and the indication flag indicates whether a data packet with a sequence number is output. For example, if an indication flag of the data packet 1 is 1, it indicates that a data packet with a sequence number 1 has been output; and if the indication flag of the data packet 1 is 0, it indicates that the data packet with the sequence number 1 has not been output. In this way, if the elimination module receives a data packet with a sequence number, the elimination module may query for an indication flag corresponding to the data packet with the sequence number. If the corresponding indication flag is 0, it indicates that the elimination module has not sent the data packet with the sequence number before, and therefore the elimination module may send the data packet. If the corresponding indication flag is 1, it indicates that the elimination module has sent the data packet with the sequence number before, and therefore the elimination module may delete the data packet. If the elimination module synchronously receives a plurality of data packets with a same sequence number, and an indication flag corresponding to the data packets with the sequence number is 0, the elimination module may select any one of the plurality of data packets with the same sequence number for outputting. If the elimination module synchronously receives a plurality of data packets with a same sequence number, and an indication flag corresponding to the data packets with the sequence number is 1, the elimination module may delete the plurality of data packets with the same sequence number that are received simultaneously.

Optionally, the method further includes: generating and configuring fourth configuration information for the second relay node, where the fourth configuration information is used to: replicate the second data packet from the first edge node; output, to the first relay node, the fifth data packet obtained through replication; and obtain and output a first received data packet between a sixth data packet obtained through replication and the third data packet from the first relay node. In other words, in an example embodiment, a replication module and an elimination module may be configured for the second relay node, for traffic flow transmission and protection.

For traffic flow transmission and protection, configuration information of each node may include ingress information and egress information of a corresponding module. The ingress information may be, for example, ingress segment information and/or ingress port information. The ingress segment information includes at least an ingress segment identifier, and optionally, may further include an ingress segment internet protocol (IP) address and/or an ingress segment label. The ingress segment IP address includes an IP address of a start node of an ingress segment and an IP address of an end node of the ingress segment. The ingress port information may include an ingress port identifier. Egress information may be, for example, egress segment information and/or egress port information. The egress segment information includes at least an egress segment identifier, and optionally, may further include an egress segment IP address and/or an egress segment label. The egress segment IP address includes an IP address of a start node of an egress segment and an IP address of an end node of the egress segment. The egress port information may include an egress port identifier. A segment refers to a link between nodes and a connection inside a node. A segment identifier is an identifier of a segment. A segment is directional. For example, a segment from the first edge node to the first relay node and a segment from the first relay node to the first edge node are not a same segment. Accordingly, segment identifiers corresponding to the two segments are also different. In this embodiment of this application, the segment identifier may be a 32-bit unsigned integer. A segment label is a label corresponding to a segment identifier, and may be an integer within a range of [16, 1048575]. A segment IP address includes an IP address of a start node of a segment and an IP address of an end node of the segment. The IP address of the start node and the IP address of the end node each may be a 32-bit IPv4 address or a 128-bit IPv6 address.

Therefore, optionally, the first configuration information includes: a first egress segment identifier of the replication module of the first edge node and a second egress segment identifier of the replication module of the first edge node. The first egress segment identifier of the replication module of the first edge node is used to identify a segment from the first edge node to the first relay node. The second egress segment identifier of the replication module of the first edge node is used to identify a segment from the first edge node to the second relay node.

Optionally, the second configuration information includes: an ingress segment identifier of the replication module of the first relay node, a first egress segment identifier of the replication module of the first relay node, and a second egress segment identifier of the replication module of the first relay node. The ingress segment identifier of the replication module of the first relay node is used to identify a segment from the first edge node to the first relay node. The first egress segment identifier of the replication module of the first relay node is used to identify a segment from the replication module of the first relay node to the elimination module of the first relay node. The second egress segment identifier of the replication module of the first relay node is used to identify a segment from the first relay node to the second relay node.

The second configuration information further includes: a first ingress segment identifier of the elimination module of the first relay node, a second ingress segment identifier of the elimination module of the first relay node, and an egress segment identifier of the elimination module of the first relay node. The first ingress segment identifier of the elimination module of the first relay node is used to identify the segment from the replication module of the first relay node to the elimination module of the first relay node. The second ingress segment identifier of the elimination module of the first relay node is used to identify a segment from the second relay node to the first relay node. The egress segment identifier of the elimination module of the first relay node is used to identify a segment from the first relay node to the second edge node.

Optionally, the third configuration information includes: a first ingress segment identifier of an elimination module of the second edge node and a second ingress segment identifier of the elimination module of the second edge node. The first ingress segment identifier of the elimination module of the second edge node is used to identify the segment from the first relay node to the second edge node. The second ingress segment identifier of the elimination module of the second edge node is used to identify a segment from the second relay node to the second edge node.

Optionally, the first configuration information further includes: a first egress segment IP address of the replication module of the first edge node and a second egress segment IP address of the replication module of the first edge node. The first egress segment IP address of the replication module of the first edge node includes an IP address of the first edge node and an IP address of the first relay node, and the first egress segment IP address of the replication module of the first edge node corresponds to the segment from the first edge node to the first relay node. The second egress segment IP address of the replication module of the first edge node includes the IP address of the first edge node and an IP address of the second relay node, and the second egress segment IP address of the replication module of the first edge node corresponds to the segment from the first edge node to the second relay node.

Optionally, the second configuration information further includes: an ingress segment IP address of the replication module of the first relay node, a first egress segment IP address of the replication module of the first relay node, and a second egress segment IP address of the replication module of the first relay node. The ingress segment IP address of the replication module of the first relay node includes an IP address of the first edge node and an IP address of the first relay node, and the ingress segment IP address of the replication module of the first relay node corresponds to the segment from the first edge node to the first relay node. The first egress segment IP address of the replication module of the first relay node includes the IP address of the first relay node, and the first egress segment IP address of the replication module of the first relay node corresponds to the segment from the replication module of the first relay node to the elimination module of the first relay node. The second egress segment IP address of the replication module of the first relay node includes the IP address of the first relay node and an IP address of the second relay node, and the second egress segment IP address of the replication module of the first relay node corresponds to the segment from the first relay node to the second relay node.

The second configuration information further includes: a first ingress segment IP address of the elimination module of the first relay node, a second ingress segment IP address of the elimination module of the first relay node, and an egress segment IP address of the elimination module of the first relay node. The first ingress segment IP address of the elimination module of the first relay node includes the IP address of the first relay node, and the first ingress segment IP address of the elimination module of the first relay node corresponds to the segment from the replication module of the first relay node to the elimination module of the first relay node. The second ingress segment IP address of the elimination module of the first relay node includes the IP address of the second relay node and the IP address of the first relay node, and the second ingress segment IP address of the elimination module of the first relay node corresponds to the segment from the second relay node to the first relay node. The egress segment IP address of the elimination module of the first relay node includes the IP address of the first relay node and an IP address of the second edge node, and the egress segment IP address of the elimination module of the first relay node corresponds to the segment from the first relay node to the second edge node.

Optionally, the third configuration information further includes: a first ingress segment IP address of the elimination module of the second edge node and a second ingress segment IP address of the elimination module of the second edge node. The first ingress segment IP address of the elimination module of the second edge node includes an IP address of the first relay node and an IP address of the second edge node, and the first ingress segment IP address of the elimination module of the second edge node corresponds to the segment from the first relay node to the second edge node. The second ingress segment IP address of the elimination module of the second edge node includes an IP address of the second relay node and an IP address of the second edge node, and the second ingress segment IP address of the elimination module of the second edge node corresponds to the segment from the second relay node to the second edge node.

Optionally, the first configuration information further includes: a first egress segment label of the replication module of the first edge node and a second egress segment label of the replication module of the first edge node. The first egress segment label of the first edge node corresponds to the segment from the first edge node to the first relay node. The second egress segment label of the first edge node corresponds to the segment from the first edge node to the second relay node.

Optionally, the second configuration information further includes: an ingress segment label of the replication module of the first relay node, a first egress segment label of the replication module of the first relay node, and a second egress segment label of the replication module of the first relay node. The ingress segment label of the replication module of the first relay node corresponds to the segment from the first edge node to the first relay node. The first egress segment label of the replication module of the first relay node corresponds to the segment from the replication module of the first relay node to the elimination module of the first relay node. The second egress segment label of the replication module of the first relay node corresponds to the segment from the first relay node to the second relay node.

The second configuration information further includes: a first ingress segment label of the elimination module of the first relay node, a second ingress segment label of the elimination module of the first relay node, and an egress segment label of the elimination module of the first relay node. The first ingress segment label of the elimination module of the first relay node corresponds to the segment from the replication module of the first relay node to the elimination module of the first relay node. The second ingress segment label of the elimination module of the first relay node corresponds to the segment from the second relay node to the first relay node. The egress segment label of the elimination module of the first relay node corresponds to the segment from the first relay node to the second edge node.

Optionally, the third configuration information further includes: a first ingress segment label of the elimination module of the second edge node and a second ingress segment label of the elimination module of the second edge node. The first ingress segment label of the elimination module of the second edge node corresponds to the segment from the first relay node to the second edge node. The second ingress segment label of the elimination module of the second edge node corresponds to the segment from the second relay node to the second edge node.

Optionally, the fourth configuration information further includes: an ingress segment identifier of a replication module of the second relay node, a first egress segment identifier of the replication module of the second relay node, and a second egress segment identifier of the replication module of the second relay node. The ingress segment identifier of the replication module of the second relay node is used to identify a segment from the first edge node to the second relay node. The first egress segment identifier of the replication module of the second relay node is used to identify a segment from the replication module of the second relay node to an elimination module of the second relay node. The second egress segment identifier of the replication module of the second relay node is used to identify a segment from the second relay node to the first relay node.

The fourth configuration information further includes: a first ingress segment identifier of the elimination module of the second relay node, a second ingress segment identifier of the elimination module of the second relay node, and an egress segment identifier of the elimination module of the second relay node. The first ingress segment identifier of the elimination module of the second relay node is used to identify the segment from the replication module of the second relay node to the elimination module of the second relay node. The second ingress segment identifier of the elimination module of the second relay node is used to identify a segment from the first relay node to the second relay node. The egress segment identifier of the elimination module of the second relay node is used to identify a segment from the second relay node to the second edge node.

Optionally, the fourth configuration information further includes: an ingress segment IP address of the replication module of the second relay node, a first egress segment IP address of the replication module of the second relay node, and a second egress segment IP address of the replication module of the second relay node. The ingress segment IP address of the replication module of the second relay node includes an IP address of the first edge node and an IP address of the second relay node, and the ingress segment IP address of the replication module of the second relay node corresponds to the segment from the first edge node to the second relay node. The first egress segment IP address of the replication module of the second relay node includes the IP address of the second relay node, and the first egress segment IP address of the replication module of the second relay node corresponds to the segment from the replication module of the second relay node to the elimination module of the second relay node. The second egress segment IP address of the replication module of the second relay node includes the IP address of the second relay node and an IP address of the first relay node, and the second egress segment IP address of the replication module of the second relay node corresponds to the segment from the second relay node to the first relay node.

The fourth configuration information further includes: a first ingress segment IP address of the elimination module of the second relay node, a second ingress segment IP address of the elimination module of the second relay node, and an egress segment IP address of the elimination module of the second relay node. The first ingress segment IP address of the elimination module of the second relay node includes the IP address of the second relay node, and the first ingress segment IP address of the elimination module of the second relay node corresponds to the segment from the replication module of the second relay node to the elimination module of the second relay node. The second ingress segment IP address of the elimination module of the second relay node includes the IP address of the second relay node, and the second ingress segment IP address of the elimination module of the second relay node corresponds to the segment from the first relay node to the second relay node. The egress segment IP address of the elimination module of the second relay node includes the IP address of the second relay node and the IP address of the second edge node, and the egress segment IP address of the elimination module of the second relay node corresponds to the segment from the second relay node to the second edge node.

Optionally, the fourth configuration information further includes: an ingress segment label of the replication module of the second relay node, a first egress segment label of the replication module of the second relay node, and a second egress segment label of the replication module of the second relay node. The ingress segment label of the replication module of the second relay node corresponds to the segment from the first edge node to the second relay node. The first egress segment label of the replication module of the second relay node corresponds to the segment from the replication module of the second relay node to the elimination module of the second relay node. The second egress segment label of the replication module of the second relay node corresponds to the segment from the second relay node to the first relay node.

The fourth configuration information further includes: a first ingress segment label of the elimination module of the second relay node, a second ingress segment label of the elimination module of the second relay node, and an egress segment label of the elimination module of the second relay node. The first ingress segment label of the elimination module of the second relay node corresponds to the segment from the replication module of the second relay node to the elimination module of the second relay node. The second ingress segment label of the elimination module of the second relay node corresponds to the segment from the first relay node to the second relay node. The egress segment label of the elimination module of the second relay node corresponds to the segment from the second relay node to the second edge node.

Optionally, the method further includes: generating and configuring fifth configuration information for the second relay node. The fifth configuration information is used to: obtain and replicate a data packet in the second data packet from the first edge node and the third data packet from the first relay node; output, to the first relay node, the fifth data packet obtained through replication; and output, to the second edge node, a sixth data packet obtained through replication. In other words, in another implementation, the elimination module and the replication module may be configured for the second relay node.

In this embodiment, there may be at least two relay nodes. If there are at least four relay nodes, optionally, the second configuration information is further used to: replicate the obtained data packet; output, to a third relay node, a seventh data packet obtained through replication; and output, to a fourth relay node, an eighth data packet obtained through replication. The method further includes: generating and configuring sixth configuration information for the third relay node, where the sixth configuration information is used to: obtain and replicate a data packet in the seventh data packet from the first relay node and a data packet from the second relay node; output, to the fourth relay node, a ninth data packet obtained through replication; obtain a data packet in a tenth data packet obtained through replication and a data packet from the fourth relay node; and send the obtained data packet to the second edge node. The third relay node is a node on the link between the first relay node and the second edge node, and the fourth relay node is not on a link from the first edge node to the second edge node through the third relay node. In actual application, if there are at least four relay nodes, in an example embodiment, two replication modules and one elimination module may be configured for the first relay node, and two elimination modules and one replication module may be configured for the third relay node.

Optionally, the method further includes: generating and configuring fourth configuration information for the second relay node. The fourth configuration information is used to: replicate the second data packet from the first edge node; output, to the first relay node, the fifth data packet obtained through replication; obtain and replicate a first received data packet between a sixth data packet obtained through replication and the third data packet from the first relay node; send, to the third relay node, an eleventh data packet obtained through replication; and send, to the fourth relay node, a twelfth data packet obtained through replication. In actual application, in an example embodiment, two replication modules and one elimination module may be configured for the second relay node.

Optionally, the method further includes: generating and configuring seventh configuration information for the fourth relay node. The seventh configuration information is used to: obtain and replicate a first received data packet between the eighth data packet from the first relay node and the twelfth data packet from the second relay node; send, to the third relay node, a thirteenth data packet obtained through replication; obtain a first received data packet between the fourteenth data packet obtained through replication and the ninth data packet from the third relay node; and send the first received data packet to the second edge node. In actual application, in an example embodiment, two elimination modules and one replication module may be configured for the fourth relay node.

Optionally, the second configuration information is further used to: send, to the fourth relay node, an eleventh data packet obtained by replicating the first data packet; and output, to the third relay node, an obtained data packet that is first received. The method further includes: generating and configuring sixth configuration information for the third relay node. The sixth configuration information is used to: replicate a data packet from the first relay node; send, to the fourth relay node, a twelfth data packet obtained through replication; obtain a first received data packet among the data packet from the second relay node, a data packet from the fourth relay node, and a thirteenth data packet obtained through replication; and send the first received data packet to the second edge node. The third relay node is a node on the link between the first relay node and the second edge node, and the fourth relay node is not on a link from the first edge node to the second edge node through the third relay node. In actual application, in an example embodiment, one replication module and one elimination module may be configured for the first relay node, and one replication module and one elimination module may be configured for the third relay node.

According to a second aspect, an embodiment of this application further provides a traffic flow processing apparatus. The apparatus may be used in a controller, and specifically includes: a first configuration module, configured to: generate and configure first configuration information for a first edge node, where the first configuration information is used to: replicate a data packet included in a received traffic flow, output, to a first relay node, a first data packet obtained through replication, and output, to a second relay node, a second data packet obtained through replication; a second configuration module, configured to generate and configure second configuration information for the first relay node, where the second configuration information is used to: replicate the first data packet, output, to the second relay node, a third data packet obtained through replication, and obtain and output a first received data packet between a fourth data packet obtained through replication and a fifth data packet from the second relay node; and a third configuration module, configured to generate and configure third configuration information for a second edge node, where the third configuration information is used to obtain a first received data packet in a data packet from the first relay node and a data packet from the second relay node. The second relay node is not on a link from the first edge node to the second edge node through the first relay node.

Optionally, the apparatus further includes: a fourth configuration module, configured to generate and configure fourth configuration information for the second relay node, where the fourth configuration information is used to: replicate the second data packet from the first edge node, output, to the first relay node, the fifth data packet obtained through replication, and obtain and output a first received data packet in a sixth data packet obtained through replication and the third data packet from the first relay node.

Optionally, the first configuration information includes: a first egress segment identifier of a replication module of the first edge node and a second egress segment identifier of the replication module of the first edge node. The first egress segment identifier of the replication module of the first edge node is used to identify a segment from the first edge node to the first relay node. The second egress segment identifier of the replication module of the first edge node is used to identify a segment from the first edge node to the second relay node.

Optionally, the second configuration information includes: an ingress segment identifier of a replication module of the first relay node, a first egress segment identifier of the replication module of the first relay node, and a second egress segment identifier of the replication module of the first relay node. The ingress segment identifier of the replication module of the first relay node is used to identify a segment from the first edge node to the first relay node. The first egress segment identifier of the replication module of the first relay node is used to identify a segment from the replication module of the first relay node to an elimination module of the first relay node. The second egress segment identifier of the replication module of the first relay node is used to identify a segment from the first relay node to the second relay node.

The second configuration information further includes: a first ingress segment identifier of the elimination module of the first relay node, a second ingress segment identifier of the elimination module of the first relay node, and an egress segment identifier of the elimination module of the first relay node. The first ingress segment identifier of the elimination module of the first relay node is used to identify the segment from the replication module of the first relay node to the elimination module of the first relay node. The second ingress segment identifier of the elimination module of the first relay node is used to identify a segment from the second relay node to the first relay node. The egress segment identifier of the elimination module of the first relay node is used to identify a segment from the first relay node to the second edge node.

Optionally, the third configuration information includes: a first ingress segment identifier of an elimination module of the second edge node and a second ingress segment identifier of the elimination module of the second edge node. The first ingress segment identifier of the elimination module of the second edge node is used to identify the segment from the first relay node to the second edge node. The second ingress segment identifier of the elimination module of the second edge node is used to identify a segment from the second relay node to the second edge node.

Optionally, the first configuration information further includes: a first egress segment IP address of the replication module of the first edge node and a second egress segment IP address of the replication module of the first edge node. The first egress segment IP address of the replication module of the first edge node includes an IP address of the first edge node and an IP address of the first relay node, and the first egress segment IP address of the replication module of the first edge node corresponds to the segment from the first edge node to the first relay node. The second egress segment IP address of the replication module of the first edge node includes the IP address of the first edge node and an IP address of the second relay node, and the second egress segment IP address of the replication module of the first edge node corresponds to the segment from the first edge node to the second relay node.

Optionally, the second configuration information further includes: an ingress segment IP address of the replication module of the first relay node, a first egress segment IP address of the replication module of the first relay node, and a second egress segment IP address of the replication module of the first relay node. The ingress segment IP address of the replication module of the first relay node includes an IP address of the first edge node and an IP address of the first relay node, and the ingress segment IP address of the replication module of the first relay node corresponds to the segment from the first edge node to the first relay node. The first egress segment IP address of the replication module of the first relay node includes the IP address of the first relay node, and the first egress segment IP address of the replication module of the first relay node corresponds to the segment from the replication module of the first relay node to the elimination module of the first relay node. The second egress segment IP address of the replication module of the first relay node includes the IP address of the first relay node and an IP address of the second relay node, and the second egress segment IP address of the replication module of the first relay node corresponds to the segment from the first relay node to the second relay node.

The second configuration information further includes: a first ingress segment IP address of the elimination module of the first relay node, a second ingress segment IP address of the elimination module of the first relay node, and an egress segment IP address of the elimination module of the first relay node. The first ingress segment IP address of the elimination module of the first relay node includes the IP address of the first relay node, and the first ingress segment IP address of the elimination module of the first relay node corresponds to the segment from the replication module of the first relay node to the elimination module of the first relay node. The second ingress segment IP address of the elimination module of the first relay node includes the IP address of the second relay node and the IP address of the first relay node, and the second ingress segment IP address of the elimination module of the first relay node corresponds to the segment from the second relay node to the first relay node. The egress segment IP address of the elimination module of the first relay node includes the IP address of the first relay node and an IP address of the second edge node, and the egress segment IP address of the elimination module of the first relay node corresponds to the segment from the first relay node to the second edge node.

Optionally, the third configuration information further includes: a first ingress segment IP address of the elimination module of the second edge node and a second ingress segment IP address of the elimination module of the second edge node. The first ingress segment IP address of the elimination module of the second edge node includes an IP address of the first relay node and an IP address of the second edge node, and the first ingress segment IP address of the elimination module of the second edge node corresponds to the segment from the first relay node to the second edge node. The second ingress segment IP address of the elimination module of the second edge node includes an IP address of the second relay node and an IP address of the second edge node, and the second ingress segment IP address of the elimination module of the second edge node corresponds to the segment from the second relay node to the second edge node.

Optionally, the first configuration information further includes: a first egress segment label of the replication module of the first edge node and a second egress segment label of the replication module of the first edge node. The first egress segment label of the first edge node corresponds to the segment from the first edge node to the first relay node. The second egress segment label of the first edge node corresponds to the segment from the first edge node to the second relay node.

Optionally, the second configuration information further includes: an ingress segment label of the replication module of the first relay node, a first egress segment label of the replication module of the first relay node, and a second egress segment label of the replication module of the first relay node. The ingress segment label of the replication module of the first relay node corresponds to the segment from the first edge node to the first relay node. The first egress segment label of the replication module of the first relay node corresponds to the segment from the replication module of the first relay node to the elimination module of the first relay node. The second egress segment label of the replication module of the first relay node corresponds to the segment from the first relay node to the second relay node.

The second configuration information further includes: a first ingress segment label of the elimination module of the first relay node, a second ingress segment label of the elimination module of the first relay node, and an egress segment label of the elimination module of the first relay node. The first ingress segment label of the elimination module of the first relay node corresponds to the segment from the replication module of the first relay node to the elimination module of the first relay node. The second ingress segment label of the elimination module of the first relay node corresponds to the segment from the second relay node to the first relay node. The egress segment label of the elimination module of the first relay node corresponds to the segment from the first relay node to the second edge node.

Optionally, the third configuration information further includes: a first ingress segment label of the elimination module of the second edge node and a second ingress segment label of the elimination module of the second edge node. The first ingress segment label of the elimination module of the second edge node corresponds to the segment from the first relay node to the second edge node. The second ingress segment label of the elimination module of the second edge node corresponds to the segment from the second relay node to the second edge node.

Optionally, the fourth configuration information further includes: an ingress segment identifier of a replication module of the second relay node, a first egress segment identifier of the replication module of the second relay node, and a second egress segment identifier of the replication module of the second relay node. The ingress segment identifier of the replication module of the second relay node is used to identify a segment from the first edge node to the second relay node. The first egress segment identifier of the replication module of the second relay node is used to identify a segment from the replication module of the second relay node to an elimination module of the second relay node. The second egress segment identifier of the replication module of the second relay node is used to identify a segment from the second relay node to the first relay node.

The fourth configuration information further includes: a first ingress segment identifier of the elimination module of the second relay node, a second ingress segment identifier of the elimination module of the second relay node, and an egress segment identifier of the elimination module of the second relay node. The first ingress segment identifier of the elimination module of the second relay node is used to identify the segment from the replication module of the second relay node to the elimination module of the second relay node. The second ingress segment identifier of the elimination module of the second relay node is used to identify a segment from the first relay node to the second relay node. The egress segment identifier of the elimination module of the second relay node is used to identify a segment from the second relay node to the second edge node.

Optionally, the fourth configuration information further includes: an ingress segment IP address of the replication module of the second relay node, a first egress segment IP address of the replication module of the second relay node, and a second egress segment IP address of the replication module of the second relay node. The ingress segment IP address of the replication module of the second relay node includes an IP address of the first edge node and an IP address of the second relay node, and the ingress segment IP address of the replication module of the second relay node corresponds to the segment from the first edge node to the second relay node. The first egress segment IP address of the replication module of the second relay node includes the IP address of the second relay node, and the first egress segment IP address of the replication module of the second relay node corresponds to the segment from the replication module of the second relay node to the elimination module of the second relay node. The second egress segment IP address of the replication module of the second relay node includes the IP address of the second relay node and an IP address of the first relay node, and the second egress segment IP address of the replication module of the second relay node corresponds to the segment from the second relay node to the first relay node.

The fourth configuration information further includes: a first ingress segment IP address of the elimination module of the second relay node, a second ingress segment IP address of the elimination module of the second relay node, and an egress segment IP address of the elimination module of the second relay node. The first ingress segment IP address of the elimination module of the second relay node includes the IP address of the second relay node, and the first ingress segment IP address of the elimination module of the second relay node corresponds to the segment from the replication module of the second relay node to the elimination module of the second relay node. The second ingress segment IP address of the elimination module of the second relay node includes the IP address of the second relay node, and the second ingress segment IP address of the elimination module of the second relay node corresponds to the segment from the first relay node to the second relay node. The egress segment IP address of the elimination module of the second relay node includes the IP address of the second relay node and the IP address of the second edge node, and the egress segment IP address of the elimination module of the second relay node corresponds to the segment from the second relay node to the second edge node.

Optionally, the fourth configuration information further includes: an ingress segment label of the replication module of the second relay node, a first egress segment label of the replication module of the second relay node, and a second egress segment label of the replication module of the second relay node. The ingress segment label of the replication module of the second relay node corresponds to the segment from the first edge node to the second relay node. The first egress segment label of the replication module of the second relay node corresponds to the segment from the replication module of the second relay node to the elimination module of the second relay node. The second egress segment label of the replication module of the second relay node corresponds to the segment from the second relay node to the first relay node.

The fourth configuration information further includes: a first ingress segment label of the elimination module of the second relay node, a second ingress segment label of the elimination module of the second relay node, and an egress segment label of the elimination module of the second relay node. The first ingress segment label of the elimination module of the second relay node corresponds to the segment from the replication module of the second relay node to the elimination module of the second relay node. The second ingress segment label of the elimination module of the second relay node corresponds to the segment from the first relay node to the second relay node. The egress segment label of the elimination module of the second relay node corresponds to the segment from the second relay node to the second edge node.

Optionally, the apparatus further includes: a fifth configuration module, configured to generate and configure fifth configuration information for the second relay node. The fifth configuration information is used to: obtain and replicate a first received data packet in the second data packet from the first edge node and the third data packet from the first relay node; output, to the first relay node, the fifth data packet obtained through replication; and output, to the second edge node, a sixth data packet obtained through replication.

Optionally, the second configuration information is further used to: replicate the obtained data packet that is first received; output, to a third relay node, a seventh data packet obtained through replication; and output, to a fourth relay node, an eighth data packet obtained through replication.

The apparatus further includes: a sixth configuration module, configured to generate and configure sixth configuration information for the third relay node. The sixth configuration information is used to: obtain and replicate a first received data packet in the seventh data packet from the first relay node and a data packet from the second relay node; output, to the fourth relay node, a ninth data packet obtained through replication; obtain a first received data packet in a tenth data packet obtained through replication and a data packet from the fourth relay node; and send the first received data packet to the second edge node.

The third relay node is a node on the link between the first relay node and the second edge node, and the fourth relay node is not on a link from the first edge node to the second edge node through the third relay node.

Optionally, the apparatus further includes a fourth configuration module, configured to generate and configure fourth configuration information for the second relay node. The fourth configuration information is used to: replicate the second data packet from the first edge node; output, to the first relay node, the fifth data packet obtained through replication; obtain and replicate a first received data packet in a sixth data packet obtained through replication and the third data packet from the first relay node; send, to the third relay node, an eleventh data packet obtained through replication; and send, to the fourth relay node, a twelfth data packet obtained through replication.

Optionally, the apparatus further includes a seventh configuration module, configured to generate and configure seventh configuration information for the fourth relay node. The seventh configuration information is used to: obtain and replicate a first received data packet in the eighth data packet from the first relay node and the twelfth data packet from the second relay node; send, to the third relay node, a thirteenth data packet obtained through replication; obtain a first received data packet in the fourteenth data packet obtained through replication and the ninth data packet from the third relay node; and send the first received data packet to the second edge node.

Optionally, the second configuration information is further used to: send, to a fourth relay node, an eleventh data packet obtained by replicating the first data packet; and output, to a third relay node, the obtained data packet that is first received.

The apparatus further includes a sixth configuration module, configured to generate and configure sixth configuration information for the third relay node. The sixth configuration information is used to: replicate a data packet from the first relay node; send, to the fourth relay node, a twelfth data packet obtained through replication; obtain a first received data packet in the data packet from the second relay node, a data packet from the fourth relay node, and a thirteenth data packet obtained through replication; and send the first received data packet to the second edge node.

The third relay node is a node on the link between the first relay node and the second edge node, and the fourth relay node is not on a link from the first edge node to the second edge node through the third relay node.

DESCRIPTION OF EMBODIMENTS

In embodiments of this application, a traffic flow is a data flow of a service. A traffic flow includes a data packet. A data packet is an Ethernet frame in an Ethernet technology; a data packet is an IP packet in an internet protocol (IP) technology; and a data packet is an MPLS packet in a multi-protocol label switching (MPLS) technology. In a current high-reliability network transmission technology, there is no technical solution to configuring each node for transmission of a traffic flow, for traffic flow transmission and protection.

For example, a deterministic network (Detnet) technology is a technology that provides an extremely low packet loss rate and a bounded latency for a real-time application traffic flow. A Detnet architecture includes two different types of nodes: an edge node and a relay node. The edge node is a source node and/or a destination node at a Detnet service layer, and the relay node is a node on a Detnet path from the source node to the destination node. A network path from the source node to the destination node includes a path segment, and the relay node is configured to connect neighboring path segments together, and provide a function of service protection.

The Detnet architecture defines functions that can be implemented on a node, including a packet replication function (PRF), a packet elimination function (PEF), and a packet ordering function (POF), which are collectively referred to as PREOF. The packet replication function means to replicate a packet and forward the packet to one or more next-hop nodes through one or more segments. The packet elimination function means to eliminate a redundant packet of packets from one or more segments, to prevent of excessive packet flooding on a network or send a repeated packet beyond a Detnet domain. The packet ordering function means to re-order disordered packets.

Although the Detnet architecture defines the functions that can be implemented on a node, the Detnet architecture does not specify that a specific function or specific functions is/are configured on a specific node for traffic flow transmission and protection.

To resolve the foregoing technical problem, embodiments of this application provide a traffic flow processing method and apparatus for traffic flow transmission and protection.

The following describes, with reference to the accompanying drawings, the traffic flow processing method and apparatus, and the device provided in the embodiments of this application.

Figure 1:
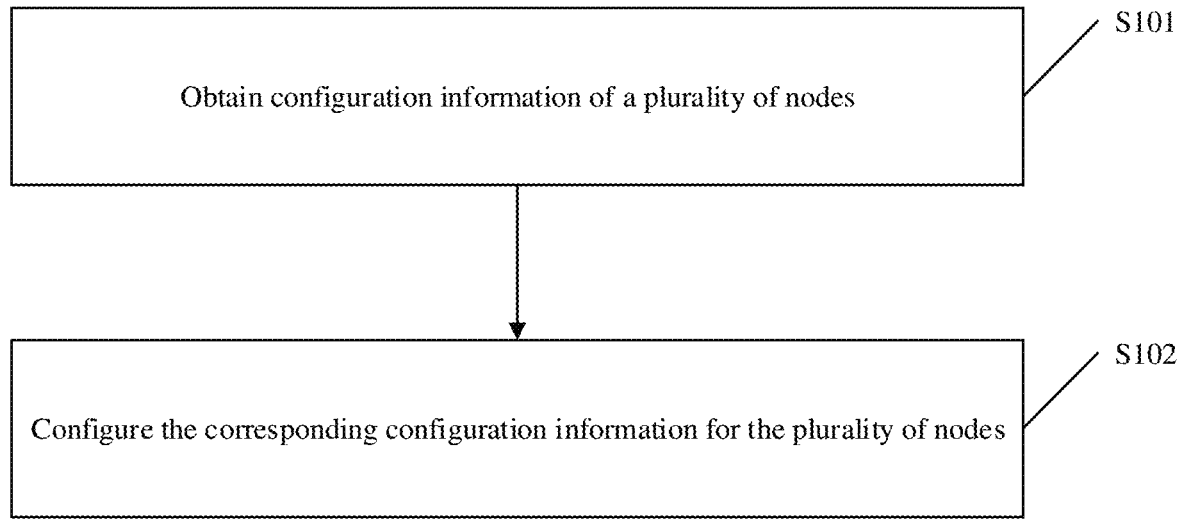
FIG. 1 is a schematic flowchart of a traffic flow processing method according to an embodiment of this application.

Referring to FIG. 1, a traffic flow processing method provided in an embodiment of this application includes the following steps.

S101: Obtain configuration information of a plurality of nodes.

In this embodiment of this application, the plurality of nodes include edge nodes and relay nodes, where the edge nodes include a first edge node and a second edge node. An edge node may be connected to a customer edge node through an attachment circuit. For example, the first edge node is connected to a first customer edge node, and the second edge node is connected to a second customer edge node. The first customer edge node transmits a traffic flow to the first edge node, and the first edge node may adaptively encapsulate the traffic flow as data packets, so that the first edge node performs transmission.

There are at least two paths between the first edge node and the second edge node, and there is at least one relay node on each path. A data packet starts from the first edge node and arrives at the second edge node through the at least two paths. The second edge node can receive the data packet provided that one path is not faulty. This ensures reliability of data transmission. After receiving the data packet, the second edge node may decapsulate non-repeated data packets, restore the non-repeated data packets to a traffic flow, and send the traffic flow to the second customer edge node.

Figure 2:
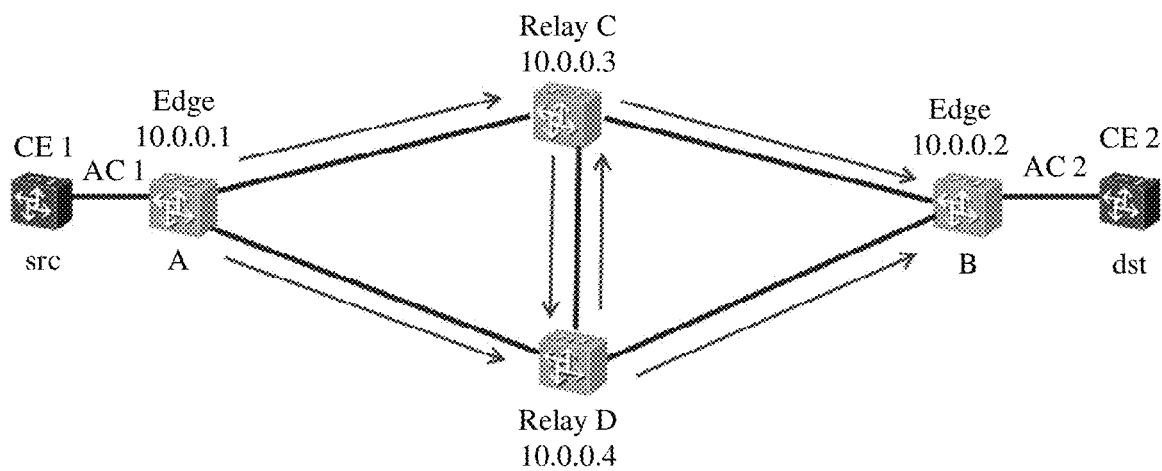
FIG. 2 is a schematic diagram of an example architecture of a plurality of nodes according to an embodiment of this application.

FIG. 2 is a schematic diagram of a possible architecture of a plurality of nodes. In this figure, a first edge node (Edge A), a second edge node (Edge B), and two relay nodes are included, where the two relay nodes are a first relay node (Relay C) and a second relay node (Relay D). The edge A, the relay C, and the relay D are connected to each other, and both the relay C and the relay D are connected to the edge B.

The edge A is connected to a CE 1 through an AC 1, so that the edge A can receive a traffic flow from the CE 1 and adaptively encapsulate the traffic flow as data packets. The edge B is connected to a CE 2 through an AC 2, so that the edge B can restore received data packets to a traffic flow and transmit the traffic flow to the CE 2.

In FIG. 2, there may be a total of four paths for a data packet from the edge A to the edge B, where the four paths are as follows:
path 1: edge A→relay C→edge B;
path 2: edge A→relay C→relay D→edge B;
path 3: edge A→relay D→edge B; and
path 4: edge A→relay D→relay C→edge B.

The traffic flow sent by the CE 1 may be transmitted from the edge A to the edge B through the four paths, and then arrives at the CE 2. The CE 2 can receive the traffic flow provided that any one of the paths is not faulty. To ensure that a data packet of the edge A can pass through the four paths, corresponding configuration information may be generated for each of the first edge node, the second edge node, the first relay node, and the second relay node, to configure a corresponding functional module.

First configuration information may be generated for the edge A. The first configuration information is used to: replicate a data packet included in a received traffic flow; output, to the relay C, a first data packet obtained through replication; and output, to the relay D, a second data packet obtained through replication. That is, the first configuration information is used to configure a replication module for the edge A. The replication module can enable the edge A to replicate the data packet included in the traffic flow received from the CE 1, to obtain the first data packet and the second data packet, to send the first data packet to the relay C, and to send the second data packet to the relay D. There may be one or more packets included in the received traffic flow.

Second configuration information may be generated for the relay C. The second configuration information is used to: replicate the first data packet; output, to the relay D, a third data packet obtained through replication; obtain a data packet in a fourth data packet obtained through replication and a data packet from the relay D; and send the obtained data packet to the edge B. Optionally, the obtained data packet may be a data packet that is first received by the relay C between the fourth data packet obtained through replication and the data packet from the relay D. That is, the second configuration information is used to configure a replication module and an elimination module for the relay C. The replication module can enable the relay C to replicate the received first data packet to obtain the third data packet and the fourth data packet, and to send the third data packet to the relay D. The elimination module can enable the relay C to obtain a first received data packet between the fourth data packet and the data packet from the relay D (namely, the following described fifth data packet), and to send the first received data packet to the edge B. If the relay C first receives the fourth data packet, the relay C sends the fourth data packet to the edge B. If the relay C first receives the fifth data packet, the relay C sends the fifth data packet to the edge B.

Fourth configuration information may be generated for the relay D. The fourth configuration information is used to: replicate the second data packet from the edge A; output, to the relay C, the fifth data packet obtained through replication; obtain a data packet from a sixth data packet obtained through replication and the third data packet from the relay C; and send the data packet to the edge B. Optionally, the obtained data packet may be a first received data packet between the sixth data packet obtained through replication and the third data packet from the relay C. That is, the fourth configuration information is used to configure a replication module and an elimination module for the relay D. The replication module of the relay D can enable the relay D to replicate the received second data packet to obtain the fifth data packet and the sixth data packet, and to send the fifth data packet to the relay C. The elimination module of the relay D can enable the relay D to obtain a first received data packet between the sixth data packet obtained through replication and the third data packet from the relay C, to send the first received data packet to the edge B, and may delete a later received data packet. In this embodiment of this application, the relay D may obtain data packets in a receiving order of the data packets, and obtains a data packet that is first received. If the relay D receives the sixth data packet before the third data packet, the relay D sends the sixth data packet to the edge B. If the relay D receives the third data packet before the sixth data packet, the relay D sends the third data packet to the edge B.

To avoid excessive flooding on a network or send a repeated data packet beyond a domain, third configuration information may be generated for the edge B. The third configuration information is used to obtain and output a data packet in a data packet received from the relay C and a data packet received from the relay D. Optionally, the obtained data packet may be a first received data packet between the data packet from the relay C and the data packet from the relay D. That is, the third configuration information is used to configure an elimination module for the edge B, and the module can enable the edge B to obtain a first received data packet between the data packet from the relay C and the data packet from the relay D, and to send the first received data packet to the CE 2. For example, if the data packet from the relay C is the fourth data packet, the data packet from the relay D is the sixth data packet, and the edge B receives the fourth data packet before the sixth data packet, the edge B may delete the sixth data packet, and send the fourth data packet to the CE 2.

Figure 3A:
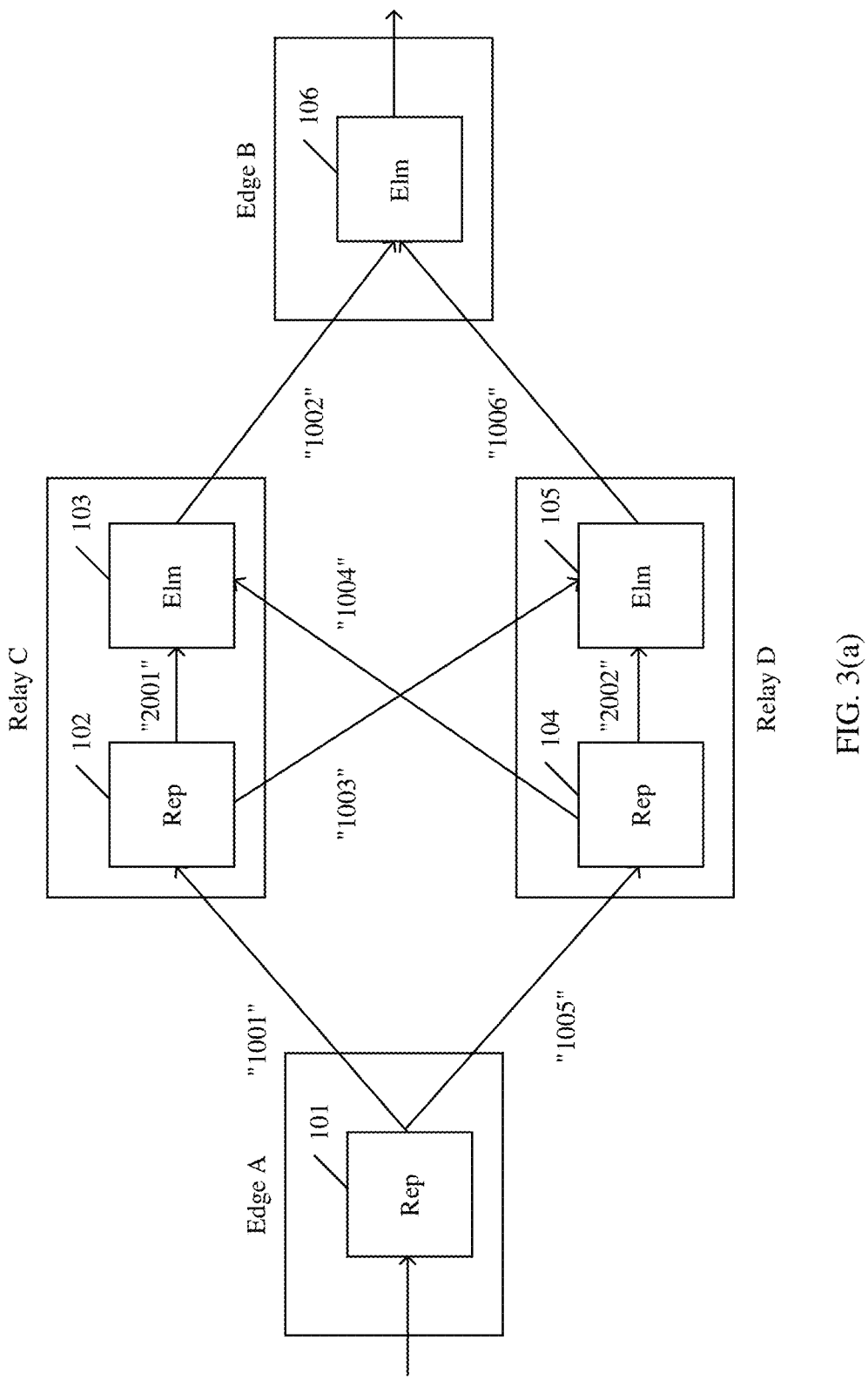
FIG. 3(a) is a schematic diagram of an example functional module architecture of the plurality of nodes according to the embodiment shown in FIG. 2.

Based on the foregoing analysis, refer to FIG. 3(a). FIG. 3(a) is a schematic diagram of a possible functional module architecture of the plurality of nodes according to the embodiment shown in FIG. 2. In FIG. 3(a), a replication module (Rep for short hereinafter) 101 may be configured for the edge A, a rep 102 and an elimination module (Elm for short hereinafter) 103 may be configured for the relay C, a rep 104 and an elm 105 may be configured for the relay D, and an elm 106 may be configured for the edge B. The rep 101 is connected to both the rep 102 and the rep 104, the rep 102 is connected to both the elm 103 and the elm 105, the rep 104 is connected to both the elm 103 and the elm 105, and both the elm 103 and the elm 105 are connected to the elm 106.

The rep 101 is configured to: replicate a received data packet to obtain a first data packet and a second data packet, send the first data packet to the rep 102, and send the second data packet to the rep 104. The rep 102 replicates the first data packet to obtain a third data packet and a fourth data packet, sends the third data packet to the elm 105, and sends the fourth data packet to the elm 103. The rep 104 replicates the second data packet to obtain a fifth data packet and a sixth data packet, sends the fifth data packet to the elm 103, and sends the sixth data packet to the elm 105. The elm 103 obtains a first received data packet between the fourth data packet and the fifth data packet, and sends the first received data packet to the elm 106. The elm 105 obtains a first received data packet between the third data packet and the sixth data packet, and sends the first received data packet to the elm 106. The elm 106 obtains a first received data packet between a data packet from the elm 103 and a data packet from the elm 105, and sends the first received data packet to the CE 2.

It should be noted that, as described above, a traffic flow may include one or more data packets. To identify different data packets, a sequence number may be used to identify each data packet of the traffic flow. Specifically, the edge A may identify data packets in a traffic flow in ascending order or descending order of sequence numbers, and continuity of the sequence numbers of the data packets reflects continuity of content of the data packets. For example, a data packet 1 indicates a $1^{st}$ data packet (an initial data packet) in a traffic flow, a data packet 2 indicates a $2^{nd}$ data packet in the traffic flow, and a packet 3 indicates a $3^{rd}$ packet in the traffic flow. When replicating the data packets in the traffic flow, the replication module of the edge A may replicate the data packets one by one in ascending order or descending order of the sequence numbers. For example, the edge A replicates the data packet 1, the data packet 2, and the data packet 3 that are included in the traffic flow. To be specific, the edge A first replicates the data packet 1, then replicates the data packet 2, and finally replicates the data packet 3. After a data packet is replicated, content and a sequence number of a data packet obtained by replicating the data packet are respectively the same as the content and sequence number of the replicated data packet. For example, at least two data packets obtained by replicating the data packet 1 each is still the data packet 1, and at least two data packets obtained by replicating the data packet 2 each is still the data packet 2. Therefore, if a traffic flow includes a plurality of data packets, there are accordingly a plurality of first data packets obtained through replication and a plurality of second data packets obtained through replication. For example, if a traffic flow includes a data packet 1, a data packet 2, and a data packet 3, the first data packet obtained through replication also includes the data packet 1, the data packet 2, and the data packet 3; and the second data packet obtained through replication also includes the data packet 1, the data packet 2, and the data packet 3.

In this embodiment, when replicating a data packet, a replication module of a relay node may replicate data packets one by one based on a receiving order of the data packets. For example, if the replication module of the relay C receives the data packet 1, the data packet 2, and the data packet 3 in order, the replication module of the relay C may replicate the data packets in the receiving order. If the data packets are out of order during transmission, the packets can still be replicated in a receiving order. For example, if the replication module of the relay C receives the data packet 1, the data packet 3, and the data packet 2 in order, the replication module of the relay C may replicate the data packets in the particular receiving order.

For the elimination module, there are two cases. In one case, the elimination module obtains at least two data packets with a same sequence number, and may select one of the at least two data packets for sending. In another case, if the elimination module receives only one data packet with a specific sequence number due to packet loss during transmission of data packets, the elimination module may send the data packet. In the former case, if the elimination module successively receives at least two data packets with a same sequence number, the elimination module may output a first received data packet; or if the elimination module synchronously receives at least two data packets with a same sequence number, the elimination module may select any one of the data packets for outputting.

For example, if the fourth data packet includes the data packet 1, and the fifth data packet also includes the data packet 1, the elimination module of the relay C selects a first received data packet 1 for sending. If the two data packets 1 are received simultaneously, the elimination module of the relay C may select either of the data packets 1 for outputting.

In an embodiment, an indication flag may be set for each data packet on the elimination module, and the indication flag indicates whether a data packet with a sequence number is sent. For example, if an indication flag of the data packet 1 is 1, it indicates that a data packet with a sequence number 1 has been sent; and if the indication flag of the data packet 1 is 0, it indicates that the data packet with the sequence number 1 has not been sent.

In this way, if the elimination module receives a data packet with a sequence number, the elimination module may query for an indication flag corresponding to the data packet with the sequence number. If the corresponding indication flag is 0, it indicates that the elimination module has not sent the data packet with the sequence number before, and therefore the elimination module may send the data packet. If the corresponding indication flag is 1, it indicates that the elimination module has sent the data packet with the sequence number before, and therefore the elimination module may delete the data packet.

To enable a data packet to be transmitted according to a flow direction shown in FIG. 3(a), configuration information of each node may include ingress information and egress information of a corresponding module.

The ingress information may be, for example, ingress segment information and/or ingress port information. The ingress segment information includes at least an ingress segment identifier, and optionally, may further include an ingress segment IP address and/or an ingress segment label. The ingress segment IP address includes an IP address of a start node of an ingress segment and an IP address of an end node of the ingress segment. The ingress port information may include an ingress port identifier.

Egress information may be, for example, egress segment information and/or egress port information. The egress segment information includes at least an egress segment identifier, and optionally, may further include an egress segment IP address and/or an egress segment label. The egress segment IP address includes an IP address of a start node of an egress segment and an IP address of an end node of the egress segment. The egress port information may include an egress port identifier.

In this embodiment, the ingress segment identifier and the egress segment identifier each may be a 32-bit unsigned integer, and the IP address of the start node and the IP address of the end node each may be a 32-bit IPv4 address or a 128-bit IPv6 address. In this specification, only the IPv4 address is used as an example for description. The ingress segment label and the egress segment label each may be an integer within a range of [16, 1048575].

Before ingress segment information and egress segment information of each node are described, a concept of segment and concepts related to the segment are first described.

In the embodiments of this application, a link between nodes and a connection inside a node may be referred to as a segment, and a segment identifier is an identifier of a segment. A segment is directional. For example, a segment from the edge A to the relay C and a segment from the relay C to the edge A are not a same segment. Accordingly, segment identifiers corresponding to the two segments are also different.

For example, in FIG. 2 and FIG. 3 (a), a segment identifier of the segment from the edge A to the relay C is "1001", a segment identifier of a segment from the relay C to the edge B is "1002", a segment identifier of a segment from the relay C to the relay D is "1003", a segment identifier of a segment from the relay D to the relay C is "1004", a segment identifier of a segment from the edge A to the relay D is "1005", and a segment identifier of a segment from the relay D to the edge B is "1006". The segment identifiers "1001" to "1006" are identifiers of segments between nodes. Segment identifiers inside nodes include, for example, a segment identifier "2001" of a segment from the rep 102 to the elm 103 in the relay C and a segment identifier "2002" of a segment from the rep 104 to the elm 105 in the relay D.

In this embodiment, a segment label is a label corresponding to a segment identifier. For example, in FIG. 2 and FIG. 3 (a), a segment label of the segment from the edge A to the relay C is "501", a segment label of the segment from the relay C to the edge B is "502", a segment label of the segment from the relay C to the relay D is "503", a segment label of the segment from the relay D to the relay C is "504", a segment label of the segment from the edge A to the relay D is "505", and a segment label of the segment from the relay D to the edge B is "506". The segment labels "501" to "506" are labels of segments between nodes. Segment labels inside nodes include, for example, a segment label "20" of the segment from the rep 102 to the elm 103 in the relay C and a segment label "21" of the segment from the rep 104 to the elm 105 in the relay D.

In addition, each node may further have an IP address. For example, in FIG. 2 and FIG. 3(a), an IP address of the edge A is 10.0.0.1, an IP address of the edge B is 10.0.0.2, an IP address of the relay C is 10.0.0.3, and an IP address of the relay D is 10.0.0.4.

In this case, configuration information of the edge A, namely, the first configuration information, may also be considered as configuration information of the rep 101, and may include an egress segment identifier "1001" and an egress segment identifier "1005". Optionally, the first configuration information may further include: an egress segment IP address 10.0.0.1 (an IP address of a start node) and an egress segment IP address 10.0.0.3 (an IP address of an end node) that correspond to the egress segment identifier "1001", and the egress segment IP address 10.0.0.1 (the IP address of the start node) and an egress segment IP address 10.0.0.4 (an IP address of an end node) that correspond to the egress segment identifier "1005". In certain embodiments, the first configuration information may include or further include: the segment label "501" corresponding to the egress segment identifier "1001" and the segment label "505" corresponding to the egress segment identifier "1005".

Configuration information of the relay C, namely, the second configuration information, includes configuration information of the rep 102 and configuration information of the elm 103.

The configuration information of the rep 102 includes: an ingress segment identifier "1001", an egress segment identifier "2001", and an egress segment identifier "1003". Optionally, the configuration information of the rep 102 may further include: the segment IP address 10.0.0.1 (the IP address of the start node) and the segment IP address 10.0.0.3 (the IP address of the end node) that correspond to the ingress segment identifier "1001", and the segment IP address 10.0.0.3 (the IP address of the start node) and the segment IP address 10.0.0.3 (the IP address of the end node) that correspond to the egress segment identifier "2001", and the segment IP address 10.0.0.3 (the IP address of the start node) and the segment IP address 10.0.0.4 (the IP address of the end node) that correspond to the egress segment identifier 1003. In an embodiment, the configuration information of the rep 102 may include or further include: the segment label "501" corresponding to the ingress segment identifier "1001", the segment label "20" corresponding to the egress segment identifier "2001", and the segment label "503" corresponding to the egress segment identifier "1003".

The configuration information of the elm 103 includes: an ingress segment identifier "2001", an ingress segment identifier "1004", and an egress segment identifier "1002". Optionally, the configuration information of the elm 103 may further include: the segment IP address 10.0.0.3 (the IP address of the start node) and the segment IP address 10.0.0.3 (the IP address of the end node) that correspond to the ingress segment identifier "2001", the segment IP address 10.0.0.4 (the IP address of the start node) and the segment IP address 10.0.0.3 (the IP address of the end node) that correspond to the ingress segment identifier "1004", and the segment IP address 10.0.0.3 (the IP address of the start node) and the segment IP address 10.0.0.2 (the IP address of the end node) that correspond to the egress segment identifier "1002". In an embodiment, the configuration information of the elm 103 may include or further include: the segment label "20" corresponding to the ingress segment identifier "2001", the segment label "504" corresponding to the ingress segment identifier "1004", and the segment label "502" corresponding to the egress segment identifier "1002".

Configuration information of the relay D, namely, the fourth configuration information, includes configuration information of the rep 104 and configuration information of the elm 105.

The configuration information of the rep 104 includes: an ingress segment identifier "1005", an egress segment identifier "2002", and an egress segment identifier "1004". Optionally, the configuration information of the rep 104 may further include: the segment IP address 10.0.0.1 (the IP address of the start node) and the segment IP address 10.0.0.4 (the IP address of the end node) that correspond to the ingress segment identifier "1005", the segment IP address 10.0.0.4 (the IP address of the start node) and the segment IP address 10.0.0.4 (the IP address of the end node) that correspond to the egress segment identifier "2002", and the segment IP address 10.0.0.4 (the IP address of the start node) and the segment IP address 10.0.0.3 (the IP address of the end node) that correspond to the egress segment identifier 1004. In an embodiment, the configuration information of the rep 104 may include or further include: the segment label "505" corresponding to the ingress segment identifier "1005", the segment label "21" corresponding to the egress segment identifier "2002", and the segment label "504" corresponding to the egress segment identifier "1004".

The configuration information of the elm 105 includes: an ingress segment identifier "2002", an ingress segment identifier "1003", and an egress segment identifier "1006". Optionally, the configuration information of the elm 105 may further include: the segment IP address 10.0.0.4 (the IP address of the start node) and the segment IP address 10.0.0.4 (the IP address of the end node) that correspond to the ingress segment identifier "2002", the segment IP address 10.0.0.3 (the IP address of the start node) and the segment IP address 10.0.0.4 (the IP address of the end node) that correspond to the ingress segment identifier "1003", and the segment IP address 10.0.0.4 (the IP address of the start node) and the segment IP address 10.0.0.2 (the IP address of the end node) that correspond to the egress segment identifier "1006". In an embodiment, the configuration information of the elm 105 may include or further include: the segment label "21" corresponding to the ingress segment identifier "2002", the segment label "503" corresponding to the ingress segment identifier "1003", and the segment label "506" corresponding to the egress segment identifier "1006".

Configuration information of the edge B, namely, the third configuration information, may also be considered as configuration information of the elm 106, and may include an ingress segment identifier "1002" and an ingress segment identifier "1006". Optionally, the third configuration information may further include: the ingress segment IP address 10.0.0.3 (the IP address of the start node) and the ingress segment IP address 10.0.0.2 (the IP address of the end node) that correspond to the ingress segment identifier "1002", and the ingress segment IP address 10.0.0.4 (the IP address of the start node) and the ingress segment IP address 10.0.0.2 (the IP address of the end node) that correspond to the ingress segment identifier "1006". In an embodiment, the third configuration information may include or further include: the segment label "502" corresponding to the ingress segment identifier "1002" and the segment label "506" corresponding to the ingress segment identifier "1006".

Certainly, it may be understood that the modules included in the foregoing nodes and compositions of the modules do not constitute any limitation on this application, and a person skilled in the art may design the modules depending on an actual situation.

For example, fifth configuration information may be generated for the relay D. The fifth configuration information is used to: obtain and replicate a first received data packet between the second data packet from the edge A and the third data packet from the relay C; output, to the relay C, the fifth data packet obtained through replication; and output, to the edge B, the sixth data packet obtained through replication. That is, the fifth configuration information is used to configure an elimination module and a replication module for the relay D. The elimination module of the relay D can enable the relay D to obtain a first received data packet between the second data packet from the edge A and the third data packet from the relay C. The replication module of the relay D is configured to: replicate the obtained data packet to obtain the fifth data packet and the sixth data packet, send the fifth data packet to the relay C, and send the sixth data packet to the edge B.

Figure 3B:
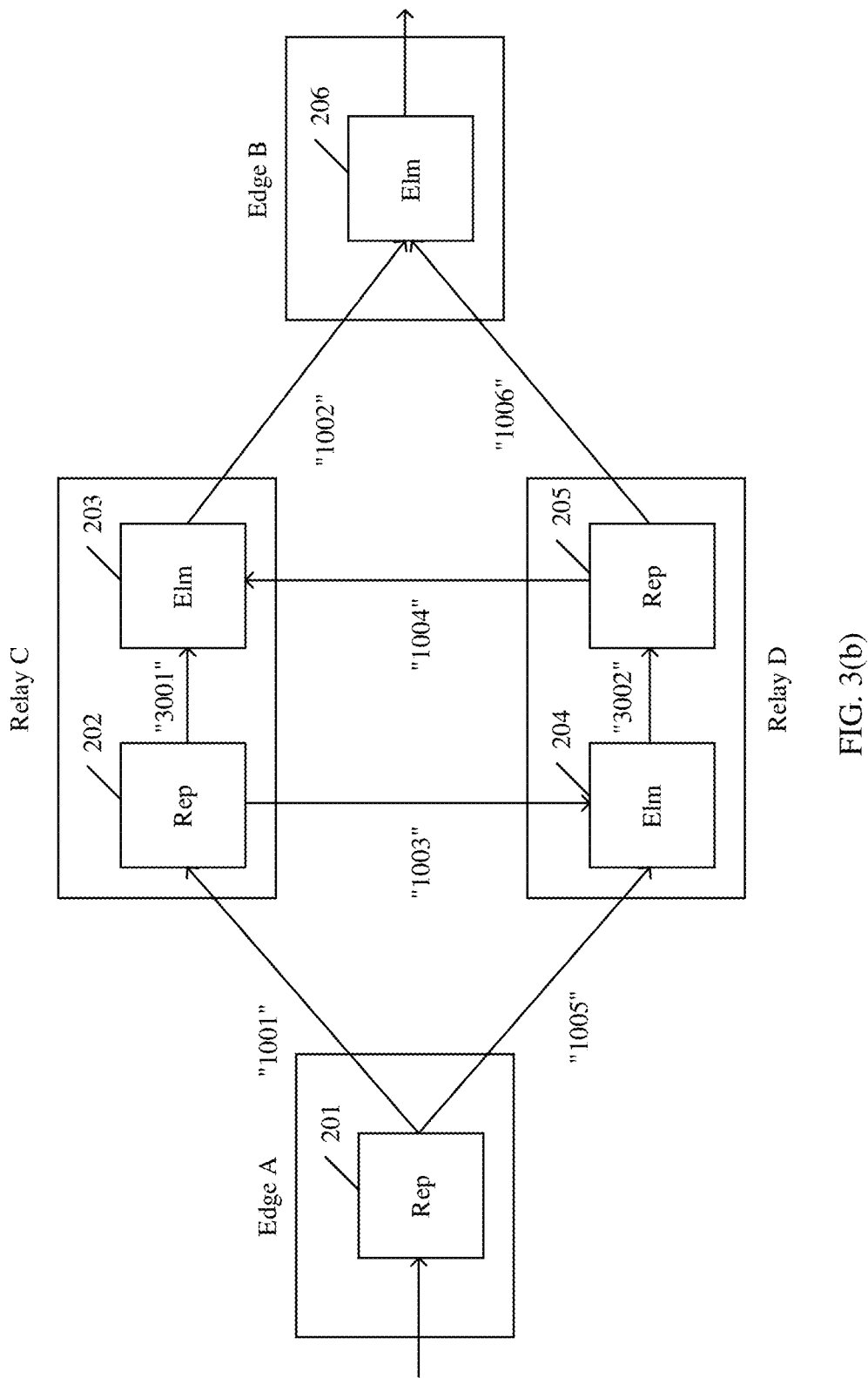
FIG. 3(b) is a schematic diagram of another example functional module architecture of the plurality of nodes according to the embodiment shown in FIG. 2.

As shown in FIG. 3(b), a rep 201 may be configured for an edge A, an elm 206 may be configured for an edge B, a rep 202 and an elm 203 may be configured for a relay C, and an elm 204 and a rep 205 may be configured for a relay D. The rep 201, the rep 202, and the elm 204 are connected to each other; the elm 203, the rep 205, and the elm 206 are connected to each other; the rep 202 is further connected to the elm 203; and the elm 204 is further connected to the rep 205.

The rep 201 is configured to replicate a received data packet to obtain a first data packet and a second data packet, send the first data packet to the rep 202, and send the second data packet to the elm 204. The rep 202 replicates the first data packet to obtain a third data packet and a fourth data packet, sends the third data packet to the elm 204, and sends the fourth data packet to the elm 203. The elm 204 obtains a first received data packet between the second data packet and the third data packet, and sends the first received data packet to the rep 205. The rep 205 replicates a data packet from the elm 204 to obtain a fifth data packet and a sixth data packet, sends the fifth data packet to the elm 203, and sends the sixth data packet to the elm 206. The elm 203 obtains a first received data packet between the fourth data packet and the fifth data packet, and sends the first received data packet to the elm 206. The elm 206 obtains a first received data packet between a data packet from the elm 203 and a data packet from the elm 205, and sends the first received data packet to the CE 2.

Correspondingly, for segment identifiers and segment labels of segments between the four nodes: the edge A, the relay C, the relay D, and the edge B, refer to the foregoing descriptions. Details are not repeated herein. Segment identifiers inside nodes include, for example, a segment identifier "3001" of a segment from the rep 202 to the elm 203 in the relay C and a segment identifier "3002" of a segment from the elm 204 to the rep 205 in the relay D. Segment labels inside nodes include, for example, a segment label "31" of the segment from the rep 202 to the elm 203 in the relay C and a segment label "32" of the segment from the elm 204 to the rep 205 in the relay D.

Configuration information of the rep 201 in the edge A is the same as the configuration information of the rep 101, and configuration information of the elm 206 in the edge B is the same as the configuration information of the elm 106. Therefore, details are not repeated herein.

Configuration information of the rep 202 and configuration information of the elm 203 in the relay C are as follows.

The configuration information of the rep 202 includes: an ingress segment identifier "1001", an egress segment identifier "3001", and an egress segment identifier "1003". Optionally, the configuration information of the rep 202 may further include: a segment IP address 10.0.0.1 (an IP address of a start node) and a segment IP address 10.0.0.3 (an IP address of an end node) that correspond to the ingress segment identifier "1001", the segment IP address 10.0.0.3 (the IP address of the start node) and the segment IP address 10.0.0.3 (the IP address of the end node) that correspond to the egress segment identifier "3001", and the segment IP address 10.0.0.3 (the IP address of the start node) and a segment IP address 10.0.0.4 (an IP address of an end node) that correspond to the egress segment identifier 1003. In an embodiment, the configuration information of the rep 202 may include or further include: the segment label "501" corresponding to the ingress segment identifier "1001", the segment label "31" corresponding to the egress segment identifier "3001", and the segment label "503" corresponding to the egress segment identifier "1003".

The configuration information of the elm 203 includes: an ingress segment identifier "3001", an ingress segment identifier "1004", and an egress segment identifier "1002". Optionally, the configuration information of the elm 203 may further include: the segment IP address 10.0.0.3 (the IP address of the start node) and the segment IP address 10.0.0.3 (the IP address of the end node) that correspond to the ingress segment identifier "3001", the segment IP address 10.0.0.4 (the IP address of the start node) and the segment IP address 10.0.0.3 (the IP address of the end node) that correspond to the ingress segment identifier "1004", and the segment IP address 10.0.0.3 (the IP address of the start node) and a segment IP address 10.0.0.2 (an IP address of an end node) that correspond to the egress segment identifier "1002". In an embodiment, the configuration information of the elm 203 may include or further include: the segment label "31" corresponding to the ingress segment identifier "3001", the segment label "504" corresponding to the ingress segment identifier "1004", and the segment label "502" corresponding to the egress segment identifier "1002".

Configuration information of the rep 204 and configuration information of the elm 205 in the relay D are as follows:

The configuration information of the elm 204 includes: an ingress segment identifier "1005", an ingress segment identifier "1003", and an egress segment identifier "3002". Optionally, the configuration information of the elm 204 may further include: the segment IP address 10.0.0.1 (the IP address of the start node) and the segment IP address 10.0.0.4 (the IP address of the end node) that correspond to the ingress segment identifier "1005", the segment IP address 10.0.0.3 (the IP address of the start node) and the segment IP address 10.0.0.4 (the IP address of the end node) that correspond to the ingress segment identifier "1003", and the segment IP address 10.0.0.4 (the IP address of the start node) and the segment IP address 10.0.0.4 (the IP address of the end node) that correspond to the egress segment identifier "3002". In an embodiment, the configuration information of the elm 204 may include or further include: a segment label "505" corresponding to the ingress segment identifier "1005", the segment label "503" corresponding to the ingress segment identifier "1003", and a segment label "32" corresponding to the egress segment identifier "3002".

The configuration information of the rep 205 includes: an ingress segment identifier "3002", the ingress segment identifier "1004", and an egress segment identifier "1006". Optionally, the configuration information of the rep 105 may further include: the segment IP address 10.0.0.4 (the IP address of the start node) and the segment IP address 10.0.0.4 (the IP address of the end node) that correspond to the ingress segment identifier "3002", the segment IP address 10.0.0.4 (the IP address of the start node) and the segment IP address 10.0.0.3 (the IP address of the end node) that correspond to the ingress segment identifier "1004", and the segment IP address 10.0.0.4 (the IP address of the start node) and the segment IP address 10.0.0.2 (the IP address of the end node) that correspond to the egress segment identifier "1006". In an embodiment, the configuration information of the rep 105 may include or further include: the segment label "32" corresponding to the ingress segment identifier "3002", a segment label "504" corresponding to the ingress segment identifier "1004", and a segment label "506" corresponding to the egress segment identifier "1006".

In addition to the ingress information and the egress information, the configuration information corresponding to each node may further include one or more of the following: a flow identifier, a module identifier, a node identifier, and the like.

The flow identifier is an identifier of a data packet. In this embodiment of this application, the flow identifier may be a 32-bit unsigned integer. Each traffic flow received by the edge A corresponds to one flow identifier, and configuration information, for a same traffic flow, of nodes includes a same flow identifier. For example, a flow identifier in each of the first configuration information, the second configuration information, the third configuration information, the fourth configuration information, and the fifth configuration information is "101".

The module identifier is an identifier of a functional module in a node. For example, an identifier of a replication module is "PRF", an identifier of an elimination module is "PEF", and an identifier of an ordering module is "POF".

The node identifier is an identifier of a node. The identifier of the node may include an IP address of the node, a number of the node, and the like. For example, a node identifier of the first relay node may include "10.0.0.3", "relay C", "node C", and the like.

The configuration information may be stored in a form of a configuration file, and the configuration file may be, for example, an extensible markup language (XML) configuration file.

In this embodiment, after the configuration information of the plurality of nodes is obtained, S102 may be performed.

S102: Configure the corresponding configuration information for the plurality of nodes.

In this embodiment, S102 and S202 are performed by a controller. The controller may be independent of each node, or may be deployed on one of the nodes, for example, the first edge node.

If the controller is independent of each node, the controller may configure the corresponding configuration information for each node by sending the corresponding configuration information to each node. To be specific, the controller sends first configuration information to the first edge node, sends second configuration information to a first relay node, sends third configuration information to the second edge node, and sends fourth configuration information or fifth configuration information to a second relay node. Specifically, the controller may send the corresponding configuration information to each node according to a protocol such as a network configuration protocol (NETCONF), a RESTCONF protocol, a path computation element communication protocol (PCEP), a border gateway protocol (BGP), or an OpenFlow protocol. The RESTCONF protocol is used to provide a hypertext transfer protocol (HTTP) interface that complies with a representational state transfer (REST) principle, and is compatible with a NETCONF data storage model. Optionally, the controller may send a corresponding remote procedure call (RPC) instruction to each node, where the instruction includes the configuration information corresponding to each node.

If the controller is deployed on the first edge node, the first edge node may directly perform configuration based on the first configuration information, and configure the corresponding configuration information for each node by sending the corresponding configuration information to the other nodes. To be specific, the first edge node sends the second configuration information to the first relay node, sends the third configuration information to the second edge node, and sends the fourth configuration information or the fifth configuration information to the second relay node.

Optionally, the first edge node may send a path message to another node according to the resource reservation protocol-traffic engineering (RSVP-TE), where the path message carries the configuration information corresponding to the another node. Specifically, the path message includes explicit route objects (ERGs), where the explicit path object is in a message format shown in Table 1. The message format may include a PREOF module type (namely, the foregoing described module identifier), a flow identifier (flow ID), a field length, and a TLV field. The TLV field may include ingress information and egress information of a functional module corresponding to the module identifier.

TABLE 1

| PREOF module type (Function Type) | Field length |
|---|---|
| Flow identifier (flow ID) | |
| TLV | |

For example, the relay C includes the rep 102 and the elm 103. Table 2 shows a message format of a path message corresponding to the relay C.

TABLE 2

| Rep | 64 |
|---|---|
| 201 | |
| (1001, 201, 10.0.0.1, 10.0.0.3, 501) | |
| (2001, 201, 10.0.0.3, 10.0.0.3, 0) | |
| (1003, 201, 10.0.0.3, 10.0.0.4, 503) | |
| Elm | 64 |
| 201 | |
| (2001, 201, 10.0.0.3, 10.0.0.3, 0) | |
| (1004, 201, 10.0.0.4, 10.0.0.3, 504) | |
| (1002, 201, 10.0.0.3, 10.0.0.2, 502) | |

In this embodiment, after obtaining the corresponding configuration information, a corresponding module may be configured for each of the plurality of nodes based on the corresponding configuration information.

For example, after obtaining the first configuration information, a replication module may be configured for the first edge node. The replication module of the first edge node is configured to: replicate a received data packet; output, to the first relay node, a first data packet obtained through replication; and output, to the second relay node, a second data packet obtained through replication.

After obtaining the second configuration information, a replication module and an elimination module may be configured for the first relay node. The replication module of the first relay node is configured to replicate the first data packet; and output, to the second relay node, a third data packet obtained through replication. The elimination module of the first relay node is configured to: obtain a first received data packet between a fourth data packet obtained through replication and a data packet from the second relay node, and send the first received data packet to the second edge node.

After obtaining the third configuration information, an elimination module may be configured for the second edge node. The elimination module of the second edge node is configured to: obtain a first received data packet between a data packet received from the first relay node and a data packet received from the second relay node, and output the first received data packet.

After obtaining the fourth configuration information, a replication module and an elimination module may be configured for the second relay node. The replication module of the second relay node is configured to replicate the second data packet from the first edge node; and output, to the first relay node, a fifth data packet obtained through replication. The elimination module of the second relay node is configured to: obtain a first received data packet between a sixth data packet obtained through replication and the third data packet from the first relay node, and send the first received data packet to the second edge node.

Alternatively, after obtaining the fifth configuration information, an elimination module and a replication module may be configured for the second relay node. The elimination module of the second relay node is configured to obtain a first received data packet between the second data packet from the first edge node and the third data packet from the first relay node. The replication module of the second relay node is configured to: replicate the data packet; output, to the first relay node, a fifth data packet obtained through replication; and output, to the second edge node, a sixth data packet obtained through replication.

In an example embodiment, each node may generate a forwarding entry of a forwarding plane based on ingress information and egress information that are included in configuration information of the node, to implement a corresponding forwarding function.

A forwarding entry of a node on a forwarding plane may include an identifier of a functional module included in the node, and an incoming label and an outgoing label of the functional module. If the configuration information does not include a segment label, the forwarding plane may determine, based on a mapping relationship between a segment identifier and a segment label, the segment label corresponding to the segment identifier. Specifically, a segment label corresponding to an ingress segment identifier is an incoming label, and a segment label corresponding to an egress segment identifier is an outgoing label.

For example, Table 3 shows forwarding entries of the relay C on the forwarding plane.

TABLE 3

| Functional module identifier | Incoming label | Outgoing label |
|---|---|---|
| Rep | 501 | 31 |
| | | 503 |
| Elm | 31 | 502 |
| | 504 | |

To forward a data packet on the forwarding plane by a node, each functional module needs to attach an outgoing label (to add a label or to replace a label) to the data packet when outputting the data packet. In this way, after receiving the data packet, a current node may obtain, through parsing, the outgoing label that is attached to the data packet on a previous node, where the outgoing label is an incoming label from the perspective of the current node, and then the current node queries for a forwarding entry based on the incoming label to determine a corresponding outgoing label.

For example, if the replication module of the relay C receives a data packet with the label 501, the replication module looks up Table 3 to determine that outgoing labels corresponding to a functional module with an identifier rep are 31 and 503. This indicates that the data packet with the label 501 needs to be replicated, an outgoing label 31 and an outgoing label 503 are attached to the two data packets obtained through replication, and the two data packets each are sent on a corresponding link. After receiving the data packet with the outgoing label 31 attached by the replication module of the relay C, the elimination module of the relay C looks up Table 3 to determine that an outgoing label corresponding to a functional module with an identifier Elm is 502. Therefore, after receiving a data packet with an outgoing label 504 attached by a previous node, the elimination module of the relay C obtains one of the two data packets and outputs the data packet on a link with the outgoing label 502.

In addition, it should be noted that the "link" described in this embodiment of this application may be a physical connection, or may be a virtual connection.

In the foregoing embodiments, there are two relay nodes. In actual application, there may be more than two relay nodes. The following provides detailed descriptions by using an example in which there are four relay nodes. Because an embodiment in the case of four relay nodes is similar to the embodiment in the case of two relay nodes, same or similar content is not repeated, and reference may be made to the foregoing descriptions.

Figure 4:
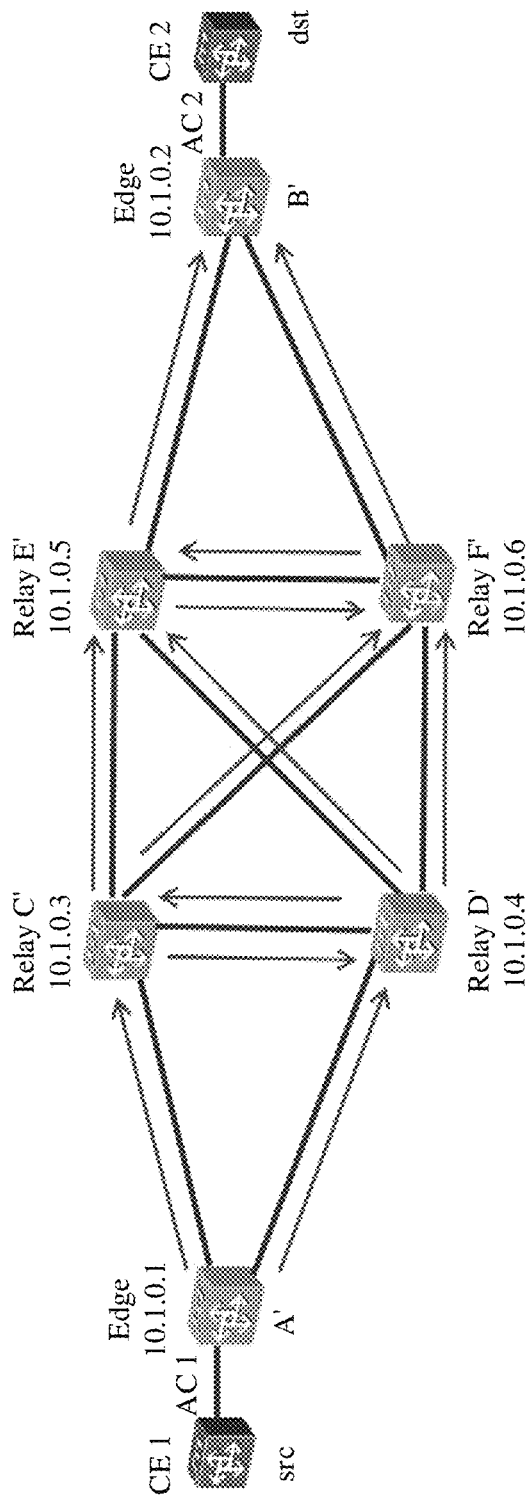
FIG. 4 is a schematic diagram of another example architecture of a plurality of nodes according to an embodiment of this application.

FIG. 4 is a schematic diagram of a possible architecture of a plurality of nodes. In this figure, a first edge node edge A', a second edge node edge B', and four relay nodes are included, where the four relay nodes include a first relay node relay C', a second relay node relay D', a third relay node relay E, and a fourth relay node relay F. The edge A', the relay C', and the relay D' are connected to each other, the relay C', the relay D', the relay E', and the relay F' are connected to each other, and the relay E', the relay F', and the edge B' are connected to each other.

An edge node may be connected to a customer edge node through an attachment circuit. Specifically, the edge A' is connected to a CE 1 through an AC 1, so that the edge A' can receive a traffic flow from the CE 1. The edge B' is connected to a CE 2 through an AC 2, so that the edge B' can transmit, to the CE 2, a traffic flow into which received data packets are integrated.

In FIG. 4, there are a total of 16 paths from the edge A' to the edge B', where the 16 paths are as follows:
 path 1: edge A'→relay C'→relay E'→edge B';
 path 2: edge A'→relay C'→relay E'→relay F→edge B';
 path 3: edge A'→relay C'→relay F→edge B';
 path 4: edge A'→relay C'→relay F→relay E'→edge B';
 path 5: edge A'→relay C'→relay D'→relay E'→edge B';
 path 6: edge A'→relay C'→relay D'→relay F→edge B';
 path 7: edge A'→relay C'→relay D'→relay F→relay E'→edge B';
 path 8: edge A'→relay C'→relay D'→relay E'→relay F→edge B';
 path 9: edge A'→relay D'→relay F→edge B';
 path 10: edge A'→relay D'→relay F→relay E'→edge B';
 path 11: edge A'→relay D'→relay E'→edge B';
 path 12: edge A'→relay D'→relay E'→relay F→edge B';
 path 13: edge A'→relay D'→relay C'→relay E→edge B';
 path 14: edge A'→relay D'→relay C'→relay E→relay F→edge B';
 path 15: edge A'→relay D'→relay C'→relay F→edge B'; and
 path 16: edge A'→relay D'→relay C'→relay F→relay E→edge B'.

The traffic flow sent by the CE 1 may be transmitted from the edge A to the edge B through the 16 paths, and then arrives at the CE 2. The CE 2 can receive the traffic flow provided that one path is not faulty. To ensure that a data packet in the traffic flow can pass through the 16 paths, corresponding configuration information may be generated for each of the first edge node the edge A', the second edge node the edge B', the first relay node relay C', the second relay node relay D', the third relay node relay E, and the fourth relay node relay F, to configure a corresponding module.

First configuration information may be generated for the edge A'. The first configuration information is used to: replicate a data packet included in a received traffic flow; output, to the relay C', a first data packet obtained through replication; and output, to the relay D', a second data packet obtained through replication. That is, the first configuration information is used to configure a replication module for the edge A'. The module can enable the edge A' to replicate the data packet in the traffic flow received from the CE 1, to obtain the first data packet and the second data packet, send the first data packet to the relay C', and send the second data packet to the relay D'.

Figure 6A:
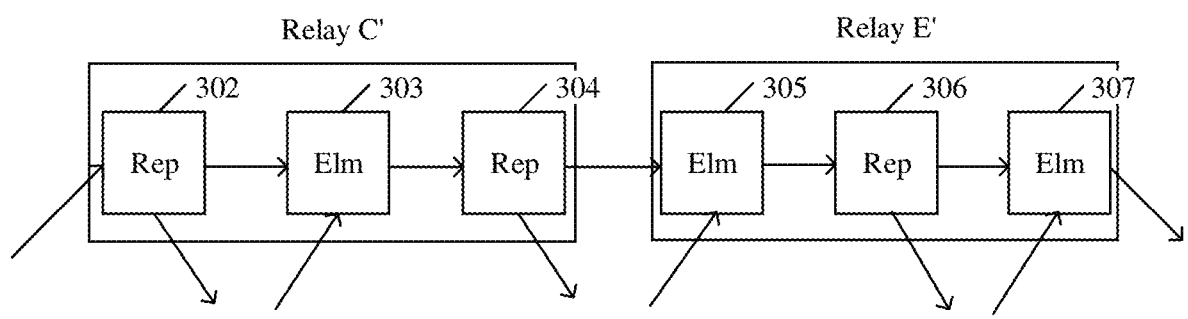
FIG. 6(a) shows example schematic architectures of functional modules of a relay C' and a relay E' according to the embodiment shown in FIG. 4.

Second configuration information may be generated for the relay C'. The second configuration information is used to: replicate the first data packet; output, to the relay D', a third data packet obtained through replication; obtain and replicate a first received data packet between a fourth data packet obtained through replication and a data packet (the following described fifth data packet) from the relay D; output, to the relay E, a seventh data packet obtained through replication; and output, to the relay F, an eighth data packet obtained through replication. That is, the second configuration information is used to configure two replication modules and one elimination module for the relay C'. A first replication module (for example, a rep 302 in FIG. 6(a) or FIG. 8) of the relay C' is configured to: replicate the first data packet to obtain the third data packet and the fourth data packet, and send the third data packet to the relay D'. The elimination module of the relay C' is configured to obtain a first received data packet between the fourth data packet and the fifth data packet that is from the relay D'. A second replication module (for example, a rep 304 in FIG. 6(a) or FIG. 8) of the relay C' is configured to replicate the first received data packet to obtain the seventh data packet and the eighth data packet, send the seventh data packet to the relay E', and send the eighth data packet to the relay F.

Sixth configuration information may be generated for the relay E'. The sixth configuration information is used to: obtain and replicate a first received data packet between the seventh data packet and a data packet (namely, the following described eleventh data packet) from the relay D'; output, to the relay F, a ninth data packet obtained through replication; obtain a first received data packet between a tenth data packet obtained through replication and a data packet (namely, the following described thirteenth data packet) from the relay F; and send the first received data packet to the edge B'. That is, the sixth configuration information is used to configure two elimination modules and a replication module for the relay E'. A first elimination module (for example, an elm 305 in FIG. 6(a) or FIG. 8) of the relay E' is configured to obtain a first received data packet between the seventh data packet and the eleventh data packet. The replication module of the relay E is configured to: replicate the first received data packet to obtain the ninth data packet and the tenth data packet, and send the ninth data packet to the relay F. A second elimination module (for example, an elm 307 in FIG. 6(a) or FIG. 8) of the relay E' is configured to: obtain a first received data packet between the tenth data packet and the thirteenth data packet, and send the first received data packet to the edge B'.

Fourth configuration information may be generated for the relay D'. The fourth configuration information is used to: replicate the second data packet from the edge A'; output, to the relay C', the fifth data packet obtained through replication; obtain and replicate a first received data packet between the sixth data packet obtained through replication and the third data packet from the relay C'; send, to the relay E', the eleventh data packet obtained through replication; and send, to the relay F', a twelfth data packet obtained through replication. That is, the fourth configuration information is used to configure two replication modules and one elimination module for the relay D'. A first replication module (for example, a rep 308 in FIG. 7(*a*) or FIG. 8) of the relay D' is configured to: replicate the second data packet to obtain the fifth data packet and the sixth data packet, and send the fifth data packet to the relay C'. The elimination module of the relay D' is configured to obtain a first received data packet between the sixth data packet and the third data packet from the relay D'. A second replication module (for example, a rep 310 in FIG. 7 (*a*) or FIG. 8) of the relay D' is configured to replicate the first received data packet to obtain the eleventh data packet and the twelfth data packet, send the eleventh data packet to the relay E, and send the twelfth data packet to the relay F.

Seventh configuration information may be generated for the relay F. The seventh configuration information is used to: obtain and replicate a first received data packet between the eighth data packet and the twelfth data packet; send, to the relay E', the thirteenth data packet obtained through replication; obtain a first received data packet between the fourteenth data packet obtained through replication and the ninth data packet from the relay E'; and send the first received data packet to the edge B'. That is, the seventh configuration information is used to configure two elimination modules and one replication module for the relay F. A first elimination module (for example, an elm 311 in FIG. 7(*a*) or FIG. 8) of the relay F' is configured to obtain a first received data packet between the eighth data packet and the twelfth data packet. The replication module of the relay F is configured to: replicate the first received data packet to obtain the thirteenth data packet and the fourteenth data packet, and send the thirteenth data packet to the relay E'. A second elimination module (for example, an elm 313 in FIG. 7(*a*) or FIG. 8) of the relay F' is configured to: obtain a first received data packet between the fourteenth data packet and the ninth data packet, and send the first received data packet to the edge B'.

Third configuration information may be generated for the edge B'. The third configuration information is used to obtain a first received data packet between a data packet received from the relay E' and a data packet received from the relay F', and may send the first received data packet to the CE 2. That is, the third configuration information is used to configure an elimination module for the edge B', and the module can enable the edge B' to obtain the first received data packet in the data packet from the relay E' and the data packet from the relay F, and to send the first received data packet to the CE 2.

Figure 5:
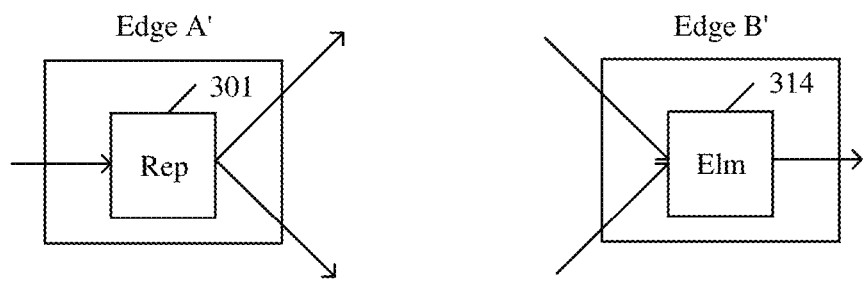
FIG. 5 shows example schematic architectures of functional modules of an edge A' and an edge B' according to the embodiment shown in FIG. 4.

Based on the foregoing analysis, refer to FIG. 5. In the figure, a rep 301 may be configured for the edge A', and an elm 314 may be configured for the edge B'. The rep 301 is configured to: obtain the data packet from the CE 1, replicate the received data packet to obtain the first data packet and the second data packet, send the first data packet to the relay C', and send the second data packet to the relay D'. The elm 314 is configured to: receive a data packet from the relay E' and a data packet from the relay F', and may obtain a first received data packet and send the first received data packet to the CE 2.

There may be a plurality of implementations for a quantity of modules included in each of the relay C', the relay D', the relay E', and the relay F' and manners of connections between the modules.

Figure 6B:
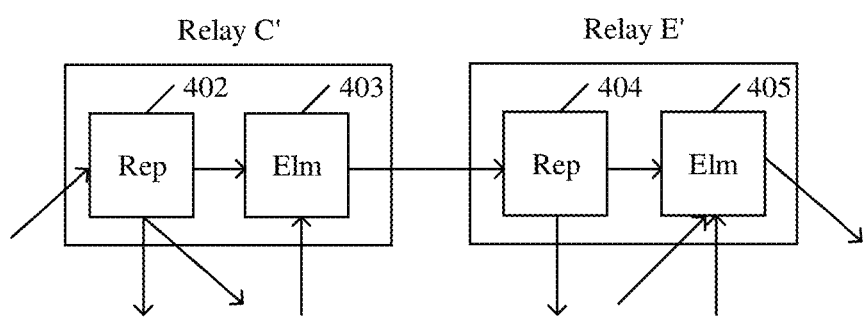
FIG. 6(b) shows other example schematic architectures of functional modules of a relay C' and a relay E' according to the embodiment shown in FIG. 4.

For the relay C', as shown in FIG. 6(*a*), in an example embodiment, the rep 302, an elm 303, and the rep 304 may be configured for the relay C'. The rep 302 is configured to: receive and replicate the first data packet to obtain the third data packet and the fourth data packet, send the third data packet to the relay D', and send the fourth data packet to the elm 303. The elm 303 obtains the first received data packet in the fourth data packet and the fifth data packet from the relay D', and sends the first received data packet to rep 304. The rep 304 replicates the received data packet to obtain the seventh data packet and the eighth data packet, and sends the seventh data packet to the relay E', and sends the eighth data packet to the relay F.

Correspondingly, the elm 305, a rep 306, and the elm 307 may be configured for the relay E. The elm 305 is configured to: obtain the first received data packet in the seventh data packet and the eleventh data packet from the relay D', and send the first received data packet to the rep 306. The rep 306 replicates the received data packet to obtain the ninth data packet and the tenth data packet, sends the ninth data packet to the relay F', and sends the tenth data packet to the elm 307.

As shown in FIG. 6(*b*), in another embodiment, a rep 402 and an elm 403 may be configured for the relay C'. The rep 402 is configured to: receive and replicate the first data packet to obtain the third data packet, the fourth data packet, and the eighth data packet; send the third data packet to the relay D'; send the fourth data packet to the elm 403; and send the eighth data packet to the relay F. The elm 403 obtains the first received data packet in the fourth data packet and the fifth data packet that is from the relay D', and sends the first received data packet to the relay E.

Correspondingly, a rep 404 and an elm 405 may be configured for the relay E. The rep 404 is configured to: replicate a data packet from the relay C' to obtain the ninth data packet and the tenth data packet, send the ninth data packet to the relay F', and send the tenth data packet to the elm 405. The elm 405 obtains a first received data packet between the tenth data packet, the eleventh data packet from the relay D', and the thirteenth data packet from the relay F', and sends the first received data packet to the edge B'.

Figure 7A:
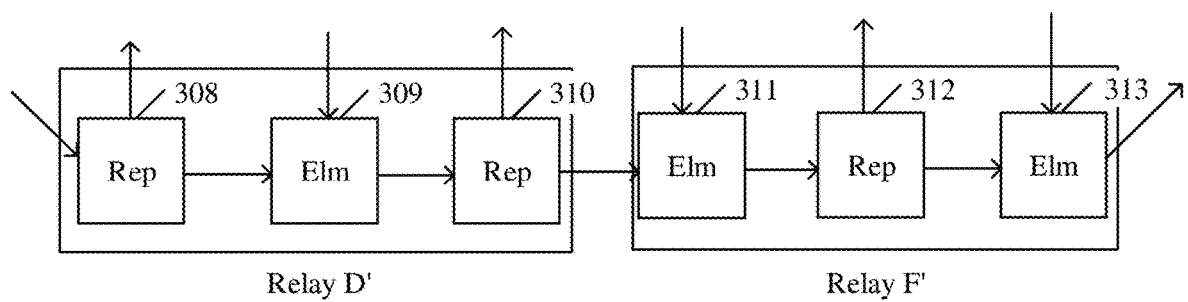
FIG. 7(a) shows example schematic architectures of functional modules of a relay D' and a relay F' according to the embodiment shown in FIG. 4.
Figure 7B:
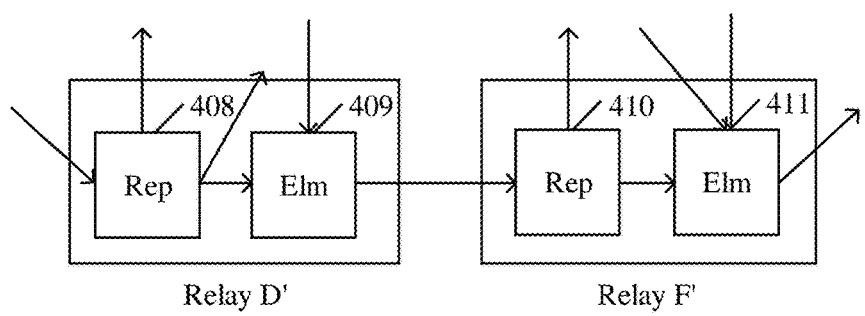
FIG. 7(b) shows other example schematic architectures of functional modules of a relay D' and a relay F' according to the embodiment shown in FIG. 4.

For the relay D', as shown in FIG. 7(*a*), in an example embodiment, the rep 308, an elm 309, and the rep 310 may be configured for the relay D'. The rep 308 replicates the second data packet to obtain the fifth data packet and the sixth data packet, sends the fifth data packet to the relay C', and sends the sixth data packet to the elm 309. The elm 309 obtains a first received data packet between the sixth data packet and the third data packet that is from the relay C', and sends the first received data packet to the rep 310. The rep 310 replicates a data packet from the elm 309 to obtain the eleventh data packet and the twelfth data packet, sends the eleventh data packet to the relay E', and sends the twelfth data packet to the relay F.

Correspondingly, the elm 311, a rep 312, and the elm 313 may be configured for the relay F. The elm 311 is configured to: obtain a first received data packet between the twelfth data packet and the eighth data packet that is from the relay C', and sends the first received data packet to the rep 312. The rep 312 replicates the received data packet to obtain the thirteenth data packet and the fourteenth data packet, sends the thirteenth data packet to the relay E', and sends the fourteenth data packet to the elm 313. The elm 313 is configured to obtain the first received data packet in the fourteenth data packet and the ninth data packet that is from the relay E', and sends the first received data packet to the edge B'.

As shown in FIG. 7 (*b*), in another embodiment, a rep 408 and an elm 409 may be configured for the relay D'. The rep 408 is configured to: replicate the second data packet from the edge A' to obtain the fifth data packet, the sixth data packet, and the eleventh data packet; send the fifth data packet to the relay C'; send the sixth data packet to the elm 409; and send the eleventh data packet to the relay E'. The elm 409 is configured to: obtain a first received data packet between the sixth data packet and the third data packet that is from the relay C', and send the first received data packet to the relay F.

Correspondingly, a rep 410, and an elm 411 may be configured for the relay F. The rep 410 is configured to: replicate a data packet from the relay D' to obtain the thirteenth data packet and the fourteenth data packet, send the thirteenth data packet to the relay E, and send the fourteenth data packet to the elm 411. The elm 411 is configured to: obtain a first received data packet between the fourteenth data packet, the eighth data packet from the relay C', and the ninth data packet from the relay E'; and send the first received data packet to the edge B'.

Certainly, the modules included in the nodes and manners of connections between the modules shown in FIG. 6(*a*), FIG. 6(*b*), FIG. 7(*a*), and FIG. 7(*b*) do not constitute any limitation on the technical solutions of this application. A person skilled in the art may further perform designing depending on an actual situation.

In addition, in embodiments of this application, either of FIG. 6(*a*) and FIG. 6(*b*) and either of FIG. 7(*a*) and FIG. 7(*b*) may be randomly combined. The following uses an example architecture obtained by combining FIG. 5, FIG. 6 (*a*), and FIG. 7 (*a*), namely, an architecture shown in FIG. 8, for detailed description.

Figure 8:
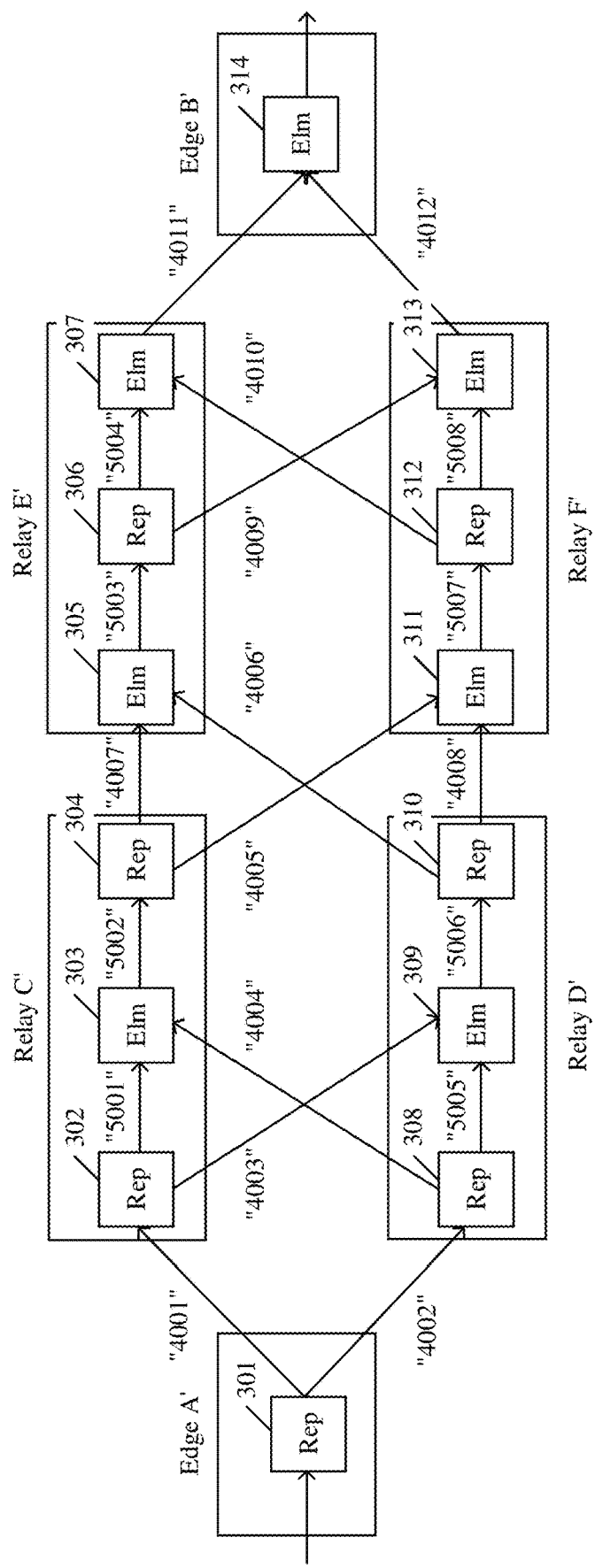
FIG. 8 is a schematic diagram of an example functional module architecture of the plurality of nodes according to the embodiment shown in FIG. 4.

Specifically, in FIG. 8, a rep 301 is connected to both a rep 302 and a rep 308; the rep 302 is connected to both an elm 303 and an elm 309; the rep 308 is connected to both the elm 303 and the elm 309; the elm 303 is connected to a rep 304; the rep 304 is connected to both an elm 305 and an elm 311; the elm 309 is connected to a rep 310; the rep 310 is connected to both the elm 305 and the elm 311; the elm 305 is connected to a rep 306; the rep 306 is connected to both an elm 307 and an elm 313; the elm 311 is connected to a rep 312; the rep 312 is connected to both the elm 307 and the elm 313; and both the elm 307 and the elm 313 are connected to an elm 314.

The rep 301 receives a data packet from a CE 1, replicates the received data packet to obtain a first data packet and a second data packet, sends the first data packet to the rep 302, and sends the second data packet to the rep 308. The rep 302 replicates the first data packet to obtain a third data packet and a fourth data packet, sends the third data packet to the elm 309, and sends the fourth data packet to the elm 303. The rep 308 replicates the second data packet to obtain a fifth data packet and a sixth data packet, sends the fifth data packet to the elm 303, and sends the sixth data packet to the elm 309. The elm 303 obtains a first received data packet between the fourth data packet and the fifth data packet, and sends the first received data packet to the rep 304. The rep 304 replicates the received data packet to obtain a seventh data packet and an eighth data packet, sends the seventh data packet to the elm 305, and sends the eighth data packet to the elm 311. The elm 309 obtains a first received data packet between the third data packet and the sixth data packet, and sends the first received data packet to the rep 310. The rep 310 replicates the received data packet to obtain an eleventh data packet and a twelfth data packet, sends the eleventh data packet to the elm 305, and sends the twelfth data packet to the elm 311. The elm 305 obtains a first received data packet between the seventh data packet and the eleventh data packet, and sends the first received data packet to the rep 306. The rep 306 replicates the received data packet to obtain a ninth data packet and a tenth data packet, sends the ninth data packet to the elm 313, and sends the tenth data packet to the elm 307. The elm 311 obtains a first received data packet between the eighth data packet and the twelfth data packet, and sends the first received data packet to the rep 312. The rep 312 replicates the received data packet to obtain a thirteenth data packet and a fourteenth data packet, sends the thirteenth data packet to the elm 307, and sends the fourteenth data packet to the elm 313. The elm 307 obtains a first received data packet between the tenth data packet and the thirteenth data packet, and sends the first received data packet to the elm 314. The elm 313 obtains a first received data packet between the ninth data packet and the fourteenth data packet, and sends the first received data packet to the elm 314. The elm 314 obtains a first received data packet between a data packet from the elm 307 and a data packet from the elm 313, and sends the first received data packet to the CE 2.

In this embodiment, a link between nodes and a connection between modules inside a node may be represented by a segment, and different segments have different segment identifiers.

For example, in FIG. 8, a segment identifier of a segment from the edge A' to the relay C' is "4001", a segment identifier of a segment from the edge A' to the relay D' is "4002", a segment identifier of a segment from the relay C' to the relay D' is "4003", a segment identifier of a segment from the relay D' to the relay C' is "4004", a segment identifier of a segment from the relay C' to the relay F' is "4005", a segment identifier of a segment from the relay D' to the relay E' is "4006", a segment identifier of a segment from the relay C' to the relay E is "4007", a segment identifier of a segment from the relay D' to the relay F is "4008", a segment identifier of a segment from the relay E' to the relay F is "4009", a segment identifier of a segment from the relay F to the relay E' is "4010", a segment identifier of a segment from the relay E' to the edge B' is "4011", and a segment identifier of a segment from the relay F to the edge B' is "4012". The segment identifiers "4001" to "4012" are identifiers of segments between nodes.

Segment identifiers inside the nodes, for example, include:

a segment identifier "5001" of a segment from rep 302 to elm 303 and a segment identifier "5002" of a segment from elm 303 to rep 304 in the relay C'; a segment identifier "5003" of a segment from elm 305 to rep 306 and a segment identifier "5004" of a segment from rep 306 to elm 307 in the relay E'; a segment identifier "5005" of a segment from rep 308 to elm 309 and a segment identifier "5006" of a segment from elm 309 to rep 310 in the relay D'; and a segment identifier "5007" of a segment from elm 311 to rep 312 and a segment identifier "5008" of a segment from rep 312 to elm 313 in the relay F'.

In this embodiment, a segment between nodes and a segment between modules inside a node may further have a segment label. For example, in FIG. 8, a segment label of the segment from the edge A' to the relay C' is "601", a segment label of the segment from the edge A' to the relay D' is "602", a segment label of the segment from the relay C' to the relay D' is "603", a segment label of the segment from the relay D' to the relay C' is "604", a segment label of the segment from the relay C' to the relay F is "605", a segment label of the segment from the relay D' to the relay E' is "606", a segment label of the segment from the relay C' to the relay E' is "607", a segment label of the segment from the relay D' to the relay F is "608", a segment label of the segment from the relay E to the relay F is "609", a segment label of the segment from the relay F' to the relay E' is "610", a segment label of the segment from the relay E' to the edge B' is "611", and a segment label of the segment from the relay F to the edge B' is "612". The segment labels "601" to "612" are labels of segments between nodes.

Segment labels inside nodes, for example, include: a segment label "41" of a segment from the rep 302 to the elm 303 and a segment label "42" of a segment from the elm 303 to the rep 304 in the relay C', a segment label "43" of a segment from the elm 305 to the rep 306 and a segment label "44" of a segment from the rep 306 to the elm 307 in the relay E', a segment label "45" of a segment from the rep 308 to the elm 309 and a segment label "46" of a segment from the elm 309 to the rep 310 in the relay D', and a segment label "47" of a segment from the elm 311 to the rep 312 and a segment label "48" of a segment from the rep 312 to the elm 313 in the relay F.

In addition, each node may further have an IP address. For example, in FIG. 4, an IP address of the edge A' is 10.1.0.1, an IP address of the edge B' is 10.1.0.2, an IP address of the relay C' is 10.1.0.3, an IP address of the relay D' is 10.1.0.4, an IP address of the relay E is 10.1.0.5, and an IP address of the relay F is 10.1.0.6.

In this case, configuration information of the edge A, namely, the first configuration information, may also be considered as configuration information of the rep 201, and may include an egress segment identifier "4001" and an egress segment identifier "4002". Optionally, the first configuration information may further include: an egress segment IP address 10.1.0.1 (an IP address of a start node) and an egress segment IP address 10.1.0.3 (an IP address of an end node) that correspond to the egress segment identifier "4001", and the egress segment IP address 10.1.0.1 (the IP address of the start node) and an egress segment IP address 10.1.0.4 (an IP address of an end node) that correspond to the egress segment identifier "4002". In an embodiment, the first configuration information may include or further include: the segment label "601" corresponding to the egress segment identifier "4001" and the segment label "602" corresponding to the egress segment identifier "4002".

Configuration information of the relay C', namely the second configuration information, includes configuration information of the rep 302, configuration information of the elm 303, and configuration information of the rep 304.

The configuration information of the rep 302 includes: an ingress segment identifier "4001", an egress segment identifier "4003", and an egress segment identifier "5001". Optionally, the configuration information of the rep 302 may further include: the ingress segment IP address 10.1.0.1 (the IP address of the start node) and the ingress segment IP address 10.1.0.3 (the IP address of the end node) that correspond to the ingress segment identifier "4001", the egress segment IP address 10.1.0.3 (an IP address of a start node) and the egress segment IP address 10.1.0.4 (the IP address of the end node) that correspond to the egress segment identifier "4003", and the egress segment IP address 10.1.0.3 (the IP address of the start node) and the egress segment IP address 10.1.0.3 (the IP address of the end node) that correspond to the egress segment identifier 5001. In an embodiment, the configuration information of the rep 302 may include or further include: the segment label "601" corresponding to the ingress segment identifier "4001", the segment label "603" corresponding to the egress segment identifier "4003", and the segment label "41" corresponding to the egress segment identifier "5001".

The configuration information of the elm 303 includes: an ingress segment identifier "5001", an ingress segment identifier "4004", and an egress segment identifier "5002". Optionally, the configuration information of the elm 303 may further include: the ingress segment IP address 10.1.0.3 (the IP address of the start node) and the ingress segment IP address 10.1.0.3 (the IP address of the end node) that correspond to the ingress segment identifier "5001", an ingress segment IP address 10.1.0.4 (an IP address of a start node) and the ingress segment IP address 10.1.0.3 (the IP address of the end node) that correspond to the ingress segment identifier "4004", and the egress segment IP address 10.1.0.3 (the IP address of the start node) and the egress segment IP address 10.1.0.3 (the IP address of the end node) that correspond to the egress segment identifier "5002". In an embodiment, the configuration information of the elm 303 may include or further include: the segment label "41" corresponding to the ingress segment identifier "5001", the segment label "604" corresponding to the ingress segment identifier "4004", and the segment label "42" corresponding to the egress segment identifier "5002".

The configuration information of the rep 304 includes: an ingress segment identifier "5002", an egress segment identifier "4005", and an egress segment identifier "4007". Optionally, the configuration information of the rep 304 may further include: the ingress segment IP address 10.1.0.3 (the IP address of the start node) and the ingress segment IP address 10.1.0.3 (the IP address of the end node) that correspond to the ingress segment identifier "5002", the egress segment IP address 10.1.0.3 (the IP address of the start node) and an egress segment IP address 10.1.0.6 (an IP address of an end node) that correspond to the egress segment identifier "4005", and the egress segment IP address 10.1.0.3 (the IP address of the start node) and an egress segment IP address 10.1.0.5 (an IP address of an end node) that correspond to the egress segment identifier 4007. In an embodiment, the configuration information of the rep 304 may include or further include: the segment label "42" corresponding to the ingress segment identifier "5002", the segment label "605" corresponding to the egress segment identifier "4005", and the segment label "607" corresponding to the egress segment identifier "4007".

Configuration information of the relay D', namely, the fourth configuration information, includes configuration information of the rep 308, configuration information of the elm 309, and configuration information of the rep 310.

The configuration information of the rep 308 includes: an ingress segment identifier "4002", an egress segment identifier "4004", and an egress segment identifier "5005". Optionally, the configuration information of the rep 308 may further include: the ingress segment IP address 10.1.0.1 (the IP address of the start node) and the ingress segment IP address 10.1.0.4 (the IP address of the end node) that correspond to the ingress segment identifier "4002", the egress segment IP address 10.1.0.4 (the IP address of the start node) and the egress segment IP address 10.1.0.3 (the IP address of the end node) that correspond to the egress segment identifier "4004", and the egress segment IP address 10.1.0.4 (the IP address of the start node) and the egress segment IP address 10.1.0.4 (the IP address of the end node) that correspond to the egress segment identifier 5005. In an embodiment, the configuration information of the rep 308 may include or further include: the segment label "602" corresponding to the ingress segment identifier "4002", the segment label "604" corresponding to the egress segment identifier "4004", and the segment label "45" corresponding to the egress segment identifier "5005".

The configuration information of the elm 309 includes: an ingress segment identifier "5005", an ingress segment identifier "4003", and an egress segment identifier "5006". Optionally, the configuration information of the elm 309 may further include: the ingress segment IP address 10.1.0.4 (the IP address of the start node) and the ingress segment IP address 10.1.0.4 (the IP address of the end node) that correspond to the ingress segment identifier "5005", the ingress segment IP address 10.1.0.3 (the IP address of the start node) and the ingress segment IP address 10.1.0.4 (the IP address of the end node) that correspond to the ingress segment identifier "4003", and the egress segment IP address 10.1.0.4 (the IP address of the start node) and the egress segment IP address 10.1.0.4 (the IP address of the end node) that correspond to the egress segment identifier 5006. In an embodiment, the configuration information of the elm 309 may include or further include: the segment label "45" corresponding to the ingress segment identifier "5005", the segment label "603" corresponding to the ingress segment identifier "4003", and the segment label "46" corresponding to the egress segment identifier "5006".

The configuration information of the rep 310 includes: an ingress segment identifier "5006", an egress segment identifier "4006", and an egress segment identifier "4008". Optionally, the configuration information of the rep 310 may further include: the ingress segment IP address 10.1.0.4 (the IP address of the start node) and the ingress segment IP address 10.1.0.4 (the IP address of the end node) that correspond to the ingress segment identifier "5006", the egress segment IP address 10.1.0.4 (the IP address of the start node) and the egress segment IP address 10.1.0.5 (the IP address of the end node) that correspond to the egress segment identifier "4006", and the egress segment IP address 10.1.0.4 (the IP address of the start node) and the egress segment IP address 10.1.0.6 (the IP address of the end node) that correspond to the egress segment identifier 4008. In an embodiment, the configuration information of the rep 304 may include or further include: the segment label "46" corresponding to the ingress segment identifier "5006", the segment label "606" corresponding to the egress segment identifier "4006", and the segment label "608" corresponding to the egress segment identifier "4008".

Configuration information of the relay E, namely, the sixth configuration information, includes configuration information of the elm 305, configuration information of the rep 306, and configuration information of the elm 307.

The configuration information of the elm 305 includes: an ingress segment identifier "4006", an ingress segment identifier "4007", and an egress segment identifier "5003". Optionally, the configuration information of the elm 305 may further include: the ingress segment IP address 10.1.0.4 (the IP address of the start node) and the ingress segment IP address 10.1.0.5 (the IP address of the end node) that correspond to the ingress segment identifier "4006", the ingress segment IP address 10.1.0.3 (the IP address of the start node) and the ingress segment IP address 10.1.0.5 (the IP address of the end node) that correspond to the ingress segment identifier "4007", and the egress segment IP address 10.1.0.5 (an IP address of a start node) and the egress segment IP address 10.1.0.5 (the IP address of the end node) that correspond to the egress segment identifier 5003. In an embodiment, the configuration information of the elm 305 may include or further include: the segment label "606" corresponding to the ingress segment identifier "4006", the segment label "607" corresponding to the ingress segment identifier "4007", and the segment label "43" corresponding to the egress segment identifier "5003".

The configuration information of the rep 306 includes: an ingress segment identifier "5003", an egress segment identifier "5004", and an egress segment identifier "4009". Optionally, the configuration information of the rep 306 may further include: the ingress segment IP address 10.1.0.5 (the IP address of the start node) and the ingress segment IP address 10.1.0.5 (the IP address of the end node) that correspond to the ingress segment identifier "5003", the egress segment IP address 10.1.0.5 (the IP address of the start node) and the egress segment IP address 10.1.0.5 (the IP address of the end node) that correspond to the egress segment identifier "5004", and the egress segment IP address 10.1.0.5 (the IP address of the start node) and the egress segment IP address 10.1.0.6 (the IP address of the end node) that correspond to the egress segment identifier 4009. In an embodiment, the configuration information of the rep 306 may include or further include: the segment label "43" corresponding to the ingress segment identifier "5003", the segment label "44" corresponding to the egress segment identifier "5004", and the segment label "609" corresponding to the egress segment identifier "4009".

The configuration information of the elm 307 includes: an ingress segment identifier "4010", an ingress segment identifier "5004", and an egress segment identifier "4011". Optionally, the configuration information of the elm 307 may further include: the ingress segment IP address 10.1.0.6 (an IP address of a start node) and the ingress segment IP address 10.1.0.5 (the IP address of the end node) that correspond to the ingress segment identifier "4010", the ingress segment IP address 10.1.0.5 (the IP address of the start node) and the ingress segment IP address 10.1.0.5 (the IP address of the end node) that correspond to the ingress segment identifier "5004", and the egress segment IP address 10.1.0.5 (the IP address of the start node) and an egress segment IP address 10.1.0.2 (an IP address of an end node) that correspond to the egress segment identifier 4011. In an embodiment, the configuration information of the elm 307 may include or further include: the segment label "610" corresponding to the ingress segment identifier "4010", the segment label "44" corresponding to the ingress segment identifier "5004", and the segment label "611" corresponding to the egress segment identifier "4011".

Configuration information of the relay F, namely, the seventh configuration information, includes configuration information of the elm 311, configuration information of the rep 312, and configuration information of the elm 313.

Configuration information of the elm 311 includes: an ingress segment identifier "4005", an ingress segment identifier "4008", and an egress segment identifier "5007". Optionally, the configuration information of the elm 311 may further include: the ingress segment IP address 10.1.0.3 (the IP address of the start node) and the ingress segment IP address 10.1.0.6 (the IP address of the end node) that correspond to the ingress segment identifier "4005", the ingress segment IP address 10.1.0.4 (the IP address of the start node) and the ingress segment IP address 10.1.0.6 (the IP address of the end node) that correspond to the ingress segment identifier "4008", and the egress segment IP address 10.1.0.6 (the IP address of the start node) and the egress segment IP address 10.1.0.6 (the IP address of the end node) that correspond to the egress segment identifier 5007. In an embodiment, the configuration information of the elm 311 may include or further include: the segment label "605" corresponding to the ingress segment identifier "4005", the segment label "608" corresponding to the ingress segment identifier "4008", and the segment label "47" corresponding to the egress segment identifier "5007".

The configuration information of the rep 312 includes: an ingress segment identifier "5007", an egress segment identifier "5008", and an egress segment identifier "4010". Optionally, the configuration information of the rep 312 may further include: the ingress segment IP address 10.1.0.6 (the IP address of the start node) and the ingress segment IP address 10.1.0.6 (the IP address of the end node) that correspond to the ingress segment identifier "5007", the egress segment IP address 10.1.0.6 (the IP address of the start node) and the egress segment IP address 10.1.0.6 (the IP address of the end node) that correspond to the egress segment identifier "5008", and the egress segment IP address 10.1.0.6 (the IP address of the start node) and the egress segment IP address 10.1.0.5 (the IP address of the end node) that correspond to the egress segment identifier 4010. In an embodiment, the configuration information of the rep 312 may include or further include: the segment label "47" corresponding to the ingress segment identifier "5007", the segment label "48" corresponding to the egress segment identifier "5008", and the segment label "610" corresponding to the egress segment identifier "4010".

The configuration information of the elm 313 includes: an ingress segment identifier "4009", an ingress segment identifier "5008", and an egress segment identifier "4012". Optionally, the configuration information of the elm 313 may further include: the ingress segment IP address 10.1.0.5 (the IP address of the start node) and the ingress segment IP address 10.1.0.6 (the IP address of the end node) that correspond to the ingress segment identifier "4009", the ingress segment IP address 10.1.0.6 (the IP address of the start node) and the ingress segment IP address 10.1.0.6 (the IP address of the end node) that correspond to the ingress segment identifier "5008", and the egress segment IP address 10.1.0.6 (the IP address of the start node) and the egress segment IP address 10.1.0.2 (the IP address of the end node) that correspond to the egress segment identifier 4012. In an embodiment, the configuration information of the elm 313 may include or further include: the segment label "609" corresponding to the ingress segment identifier "4009", the segment label "48" corresponding to the ingress segment identifier "5008", and the segment label "612" corresponding to the egress segment identifier "4012".

Configuration information of the edge B', namely, the third configuration information, may be considered as configuration information of the elm 314. The configuration information of the elm 314 includes: an ingress segment identifier "4011" and an ingress segment identifier "4012". Optionally, the configuration information of the elm 314 may further include: the ingress segment IP address 10.1.0.5 (the IP address of the start node) and the ingress segment IP address 10.1.0.2 (the IP address of the end node) that correspond to the ingress segment identifier "4011", and the ingress segment IP address 10.1.0.6 (the IP address of the start node) and the ingress segment IP address 10.1.0.2 (the IP address of the end node) that correspond to the ingress segment identifier "4012". In an embodiment, the configuration information of the elm 314 may include or further include: the segment label "611" corresponding to the ingress segment identifier "4011" and the segment label "612" corresponding to the ingress segment identifier "4012".

In the foregoing embodiment, the second edge node has only the elimination module. In actual application, the second edge node may further have an ordering module, configured to order a plurality of received data packets. As described above, to distinguish between different data packets, different data packets may correspond to different data packet identifiers, and the data packet identifiers may be ordered in ascending order based on a generation order of the data packets. When receiving data packets with different data packet identifiers, the second edge node may order the data packets based on the data packet identifiers, so that the CE 2 can receive the data packets that are sequentially ordered.

Therefore, the third configuration information generated for the second edge node may be further used to order a plurality of data packets output by the elimination module of the second edge node.

In addition, it should be noted that the replication module may perform a packet replication function, the elimination module may perform a packet elimination function, and the ordering module may perform a packet ordering function.

Figure 9:
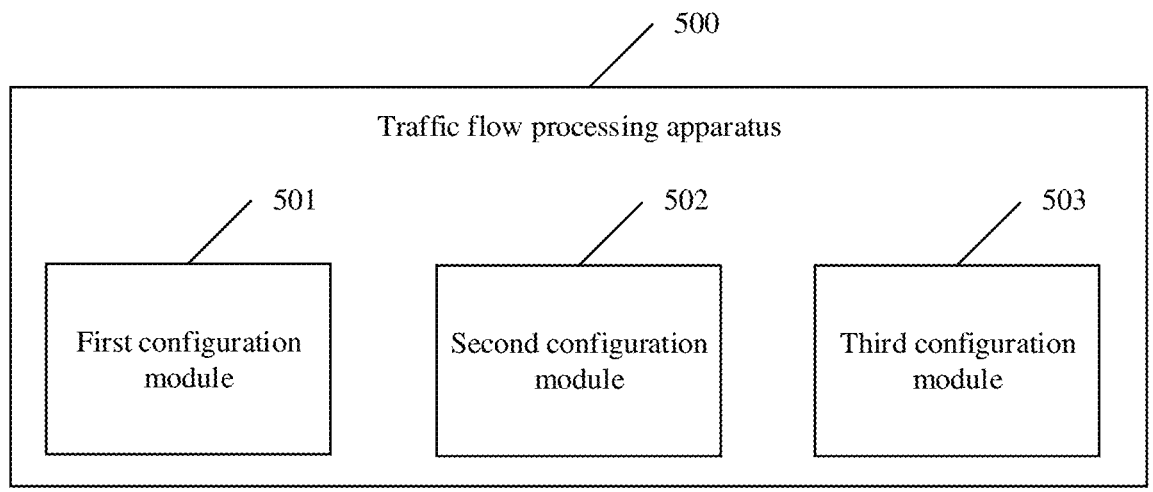
FIG. 9 is a schematic structural diagram of a traffic flow processing apparatus according to an embodiment of this application.

FIG. 9 is a schematic structural diagram of a traffic flow processing apparatus according to an embodiment of this application.

The traffic flow processing apparatus provided in this embodiment may be used in a controller.

The traffic flow processing apparatus 500 specifically includes:

a first configuration module 501, configured to generate and configure first configuration information for a first edge node, where the first configuration information is used to: replicate a data packet included in a received traffic flow; output, to a first relay node, a first data packet obtained through replication; and output, to a second relay node, a second data packet obtained through replication;

a second configuration module 502, configured to generate and configure second configuration information for the first relay node, where the second configuration information is used to: replicate the first data packet; output, to the second relay node, a third data packet obtained through replication; and obtain and output a first received data packet between a fourth data packet obtained through replication and a fifth data packet from the second relay node; and a third configuration module 503, configured to generate and configure third configuration information for a second edge node, where the third configuration information is used to obtain a first received data packet between a data packet from the first relay node and a data packet from the second relay node, and the second relay node is not on a link from the first edge node to the second edge node through the first relay node.

In this embodiment, protection and transmission of a traffic flow is implemented by using the first configuration module 501, the second configuration module 502, and the third configuration module 503.

Optionally, the apparatus 500 further includes: a fourth configuration module, configured to generate and configure fourth configuration information for the second relay node, where the fourth configuration information is used to: replicate the second data packet from the first edge node; output, to the first relay node, the fifth data packet obtained through replication; and obtain and output a first received data packet between a sixth data packet obtained through replication and the third data packet from the first relay node.

Optionally, the first configuration information includes: a first egress segment identifier of a replication module of the first edge node and a second egress segment identifier of the replication module of the first edge node. The first egress segment identifier of the replication module of the first edge node is used to identify a segment from the first edge node to the first relay node. The second egress segment identifier of the replication module of the first edge node is used to identify a segment from the first edge node to the second relay node.

Optionally, the second configuration information includes: an ingress segment identifier of a replication module of the first relay node, a first egress segment identifier of the replication module of the first relay node, and a second egress segment identifier of the replication module of the first relay node. The ingress segment identifier of the replication module of the first relay node is used to identify a segment from the first edge node to the first relay node. The first egress segment identifier of the replication module of the first relay node is used to identify a segment from the replication module of the first relay node to an elimination module of the first relay node. The second egress segment identifier of the replication module of the first relay node is used to identify a segment from the first relay node to the second relay node.

The second configuration information further includes: a first ingress segment identifier of the elimination module of the first relay node, a second ingress segment identifier of the elimination module of the first relay node, and an egress segment identifier of the elimination module of the first relay node. The first ingress segment identifier of the elimination module of the first relay node is used to identify the segment from the replication module of the first relay node to the elimination module of the first relay node. The second ingress segment identifier of the elimination module of the first relay node is used to identify a segment from the second relay node to the first relay node. The egress segment identifier of the elimination module of the first relay node is used to identify a segment from the first relay node to the second edge node.

Optionally, the third configuration information includes: a first ingress segment identifier of an elimination module of the second edge node and a second ingress segment identifier of the elimination module of the second edge node. The first ingress segment identifier of the elimination module of the second edge node is used to identify the segment from the first relay node to the second edge node. The second ingress segment identifier of the elimination module of the second edge node is used to identify a segment from the second relay node to the second edge node.

Optionally, the first configuration information further includes: a first egress segment IP address of the replication module of the first edge node and a second egress segment IP address of the replication module of the first edge node. The first egress segment IP address of the replication module of the first edge node includes an IP address of the first edge node and an IP address of the first relay node, and the first egress segment IP address of the replication module of the first edge node corresponds to the segment from the first edge node to the first relay node. The second egress segment IP address of the replication module of the first edge node includes the IP address of the first edge node and an IP address of the second relay node, and the second egress segment IP address of the replication module of the first edge node corresponds to the segment from the first edge node to the second relay node.

Optionally, the second configuration information further includes: an ingress segment IP address of the replication module of the first relay node, a first egress segment IP address of the replication module of the first relay node, and a second egress segment IP address of the replication module of the first relay node. The ingress segment IP address of the replication module of the first relay node includes an IP address of the first edge node and an IP address of the first relay node, and the ingress segment IP address of the replication module of the first relay node corresponds to the segment from the first edge node to the first relay node. The first egress segment IP address of the replication module of the first relay node includes the IP address of the first relay node, and the first egress segment IP address of the replication module of the first relay node corresponds to the segment from the replication module of the first relay node to the elimination module of the first relay node. The second egress segment IP address of the replication module of the first relay node includes the IP address of the first relay node and an IP address of the second relay node, and the second egress segment IP address of the replication module of the first relay node corresponds to the segment from the first relay node to the second relay node.

The second configuration information further includes: a first ingress segment IP address of the elimination module of the first relay node, a second ingress segment IP address of the elimination module of the first relay node, and an egress segment IP address of the elimination module of the first relay node. The first ingress segment IP address of the elimination module of the first relay node includes the IP address of the first relay node, and the first ingress segment IP address of the elimination module of the first relay node corresponds to the segment from the replication module of the first relay node to the elimination module of the first relay node. The second ingress segment IP address of the elimination module of the first relay node includes the IP address of the second relay node and the IP address of the first relay node, and the second ingress segment IP address of the elimination module of the first relay node corresponds to the segment from the second relay node to the first relay node. The egress segment IP address of the elimination module of the first relay node includes the IP address of the first relay node and an IP address of the second edge node, and the egress segment IP address of the elimination module of the first relay node corresponds to the segment from the first relay node to the second edge node.

Optionally, the third configuration information further includes: a first ingress segment IP address of the elimination module of the second edge node and a second ingress segment IP address of the elimination module of the second edge node. The first ingress segment IP address of the elimination module of the second edge node includes an IP address of the first relay node and an IP address of the second edge node, and the first ingress segment IP address of the elimination module of the second edge node corresponds to the segment from the first relay node to the second edge node. The second ingress segment IP address of the elimination module of the second edge node includes an IP address of the second relay node and an IP address of the second edge node, and the second ingress segment IP address of the elimination module of the second edge node corresponds to the segment from the second relay node to the second edge node.

Optionally, the first configuration information further includes: a first egress segment label of the replication module of the first edge node and a second egress segment label of the replication module of the first edge node. The first egress segment label of the first edge node corresponds to the segment from the first edge node to the first relay node. The second egress segment label of the first edge node corresponds to the segment from the first edge node to the second relay node.

Optionally, the second configuration information further includes: an ingress segment label of the replication module of the first relay node, a first egress segment label of the replication module of the first relay node, and a second egress segment label of the replication module of the first relay node. The ingress segment label of the replication module of the first relay node corresponds to the segment from the first edge node to the first relay node. The first egress segment label of the replication module of the first relay node corresponds to the segment from the replication module of the first relay node to the elimination module of the first relay node. The second egress segment label of the replication module of the first relay node corresponds to the segment from the first relay node to the second relay node.

The second configuration information further includes: a first ingress segment label of the elimination module of the first relay node, a second ingress segment label of the elimination module of the first relay node, and an egress segment label of the elimination module of the first relay node. The first ingress segment label of the elimination module of the first relay node corresponds to the segment from the replication module of the first relay node to the elimination module of the first relay node. The second ingress segment label of the elimination module of the first relay node corresponds to the segment from the second relay node to the first relay node. The egress segment label of the elimination module of the first relay node corresponds to the segment from the first relay node to the second edge node.

Optionally, the third configuration information further includes: a first ingress segment label of the elimination module of the second edge node and a second ingress segment label of the elimination module of the second edge node. The first ingress segment label of the elimination module of the second edge node corresponds to the segment from the first relay node to the second edge node. The second ingress segment label of the elimination module of the second edge node corresponds to the segment from the second relay node to the second edge node.

Optionally, the fourth configuration information further includes: an ingress segment identifier of a replication module of the second relay node, a first egress segment identifier of the replication module of the second relay node, and a second egress segment identifier of the replication module of the second relay node. The ingress segment identifier of the replication module of the second relay node is used to identify a segment from the first edge node to the second relay node. The first egress segment identifier of the replication module of the second relay node is used to identify a segment from the replication module of the second relay node to an elimination module of the second relay node. The second egress segment identifier of the replication module of the second relay node is used to identify a segment from the second relay node to the first relay node.

The fourth configuration information further includes: a first ingress segment identifier of the elimination module of the second relay node, a second ingress segment identifier of the elimination module of the second relay node, and an egress segment identifier of the elimination module of the second relay node. The first ingress segment identifier of the elimination module of the second relay node is used to identify the segment from the replication module of the second relay node to the elimination module of the second relay node. The second ingress segment identifier of the elimination module of the second relay node is used to identify a segment from the first relay node to the second relay node. The egress segment identifier of the elimination module of the second relay node is used to identify a segment from the second relay node to the second edge node.

Optionally, the fourth configuration information further includes: an ingress segment IP address of the replication module of the second relay node, a first egress segment IP address of the replication module of the second relay node, and a second egress segment IP address of the replication module of the second relay node. The ingress segment IP address of the replication module of the second relay node includes an IP address of the first edge node and an IP address of the second relay node, and the ingress segment IP address of the replication module of the second relay node corresponds to the segment from the first edge node to the second relay node. The first egress segment IP address of the replication module of the second relay node includes the IP address of the second relay node, and the first egress segment IP address of the replication module of the second relay node corresponds to the segment from the replication module of the second relay node to the elimination module of the second relay node. The second egress segment IP address of the replication module of the second relay node includes the IP address of the second relay node and an IP address of the first relay node, and the second egress segment IP address of the replication module of the second relay node corresponds to the segment from the second relay node to the first relay node.

The fourth configuration information further includes: a first ingress segment IP address of the elimination module of the second relay node, a second ingress segment IP address of the elimination module of the second relay node, and an egress segment IP address of the elimination module of the second relay node. The first ingress segment IP address of the elimination module of the second relay node includes the IP address of the second relay node, and the first ingress segment IP address of the elimination module of the second relay node corresponds to the segment from the replication module of the second relay node to the elimination module of the second relay node. The second ingress segment IP address of the elimination module of the second relay node includes the IP address of the second relay node, and the second ingress segment IP address of the elimination module of the second relay node corresponds to the segment from the first relay node to the second relay node. The egress segment IP address of the elimination module of the second relay node includes the IP address of the second relay node and the IP address of the second edge node, and the egress segment IP address of the elimination module of the second relay node corresponds to the segment from the second relay node to the second edge node.

Optionally, the fourth configuration information further includes: an ingress segment label of the replication module of the second relay node, a first egress segment label of the replication module of the second relay node, and a second egress segment label of the replication module of the second relay node. The ingress segment label of the replication module of the second relay node corresponds to the segment from the first edge node to the second relay node. The first egress segment label of the replication module of the second relay node corresponds to the segment from the replication module of the second relay node to the elimination module of the second relay node. The second egress segment label of the replication module of the second relay node corresponds to the segment from the second relay node to the first relay node.

The fourth configuration information further includes: a first ingress segment label of the elimination module of the second relay node, a second ingress segment label of the elimination module of the second relay node, and an egress segment label of the elimination module of the second relay node. The first ingress segment label of the elimination module of the second relay node corresponds to the segment from the replication module of the second relay node to the elimination module of the second relay node. The second ingress segment label of the elimination module of the second relay node corresponds to the segment from the first relay node to the second relay node. The egress segment label of the elimination module of the second relay node corresponds to the segment from the second relay node to the second edge node.

Optionally, the apparatus further includes: a fifth configuration module, configured to generate and configure fifth configuration information for the second relay node. The fifth configuration information is used to: obtain and replicate a first received data packet between the second data packet from the first edge node and the third data packet from the first relay node; output, to the first relay node, the fifth data packet obtained through replication; and output, to the second edge node, a sixth data packet obtained through replication.

Optionally, the second configuration information is further used to: replicate the obtained data packet that is first received; output, to a third relay node, a seventh data packet obtained through replication; and output, to a fourth relay node, an eighth data packet obtained through replication.

The apparatus further includes a sixth configuration module, configured to generate and configure sixth configuration information for the third relay node. The sixth configuration information is used to: obtain and replicate a first received data packet between the seventh data packet from the first relay node and a data packet from the second relay node; output, to the fourth relay node, a ninth data packet obtained through replication; obtain a first received data packet between a tenth data packet obtained through replication and a data packet from the fourth relay node; and send the first received data packet to the second edge node.

The third relay node is a node on the link between the first relay node and the second edge node, and the fourth relay node is not on a link from the first edge node to the second edge node through the third relay node.

Optionally, the apparatus further includes a fourth configuration module, configured to generate and configure fourth configuration information for the second relay node. The fourth configuration information is used to: replicate the second data packet from the first edge node; output, to the first relay node, the fifth data packet obtained through replication; obtain and replicate a first received data packet between a sixth data packet obtained through replication and the third data packet from the first relay node; send, to the third relay node, an eleventh data packet obtained through replication; and send, to the fourth relay node, a twelfth data packet obtained through replication.

Optionally, the apparatus further includes a seventh configuration module, configured to generate and configure seventh configuration information for the fourth relay node. The seventh configuration information is used to: obtain and replicate a first received data packet between the eighth data packet from the first relay node and the twelfth data packet from the second relay node; send, to the third relay node, a thirteenth data packet obtained through replication; obtain a first received data packet between the fourteenth data packet obtained through replication and the ninth data packet from the third relay node; and send the first received data packet to the second edge node.

Optionally, the second configuration information is further used to: send, to a fourth relay node, an eleventh data packet obtained by replicating the first data packet; and output, to a third relay node, the obtained data packet that is first received.

The apparatus further includes a sixth configuration module, configured to generate and configure sixth configuration information for the third relay node. The sixth configuration information is used to: replicate a data packet from the first relay node; send, to the fourth relay node, a twelfth data packet obtained through replication; obtain a first received data packet between the data packet from the second relay node, a data packet from the fourth relay node, and a thirteenth data packet obtained through replication; and send the first received data packet to the second edge node.

The third relay node is a node on the link between the first relay node and the second edge node, and the fourth relay node is not on a link from the first edge node to the second edge node through the third relay node.

Figure 10:
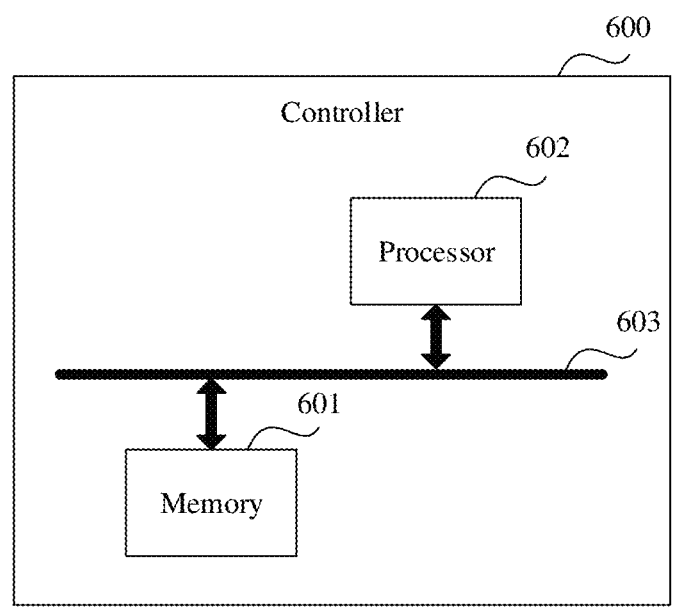
FIG. 10 is a schematic structural diagram of a controller according to an embodiment of this application.

As shown in FIG. 10, an embodiment of this application provides a controller 600. The controller 600 may include a memory 601 and a processor 602.

The memory 601 is configured to store an instruction.

The processor 602 is configured to execute the instruction in the memory 601, to perform the foregoing traffic flow processing method.

The memory 601 and the processor 602 are connected to each other through a bus 603.

The bus 603 may be a peripheral component interconnect (PCI) bus, an extended industry standard architecture (EISA) bus, or the like. The bus 603 may be classified into an address bus, a data bus, a control bus, and the like. For ease of representation, only one thick line is used to represent the bus in FIG. 10, but this does not mean that there is only one bus or only one type of bus.

The memory 601 may be a random access memory (RAM), a flash memory, a read-only memory (ROM), an erasable programmable read-only memory (EPROM), an electrically erasable programmable read-only memory (EEPROM), a register, a hard disk, a removable hard disk, a CD-ROM, or any other form of storage medium known to a person skilled in the art.

The processor 602 may be, for example, a central processing unit (CPU), a general-purpose processor, a digital signal processor (DSP), an application-specific integrated circuit (ASIC), or a field programmable gate array (FPGA) or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor.

An embodiment of this application further provides a computer-readable storage medium, including one or more instructions. When the one or more instructions are run on a computer, the computer is enabled to perform the foregoing traffic flow processing method applied to a controller.

In the specification, claims, and accompanying drawings of this application, the terms "first", "second", "third", "fourth", and the like (if existent) are intended to distinguish between similar objects but do not necessarily indicate a specific order or sequence. It should be understood that the data used in such a way are interchangeable in proper circumstances so that the embodiments described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

It may be clearly understood by a person skilled in the art that, for convenient and brief description, for a detailed working process of the foregoing system, apparatus, and unit, refer to a corresponding process in the foregoing method embodiments, and details are not repeated herein.

In the several embodiments provided in this application, it should be understood that, the disclosed system, apparatus, and method may be implemented in another manner. For example, the described apparatus embodiments are merely examples. For example, the division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be obtained depending on actual requirements to achieve the objectives of the solutions in the embodiments.

In addition, functional units in the embodiments of this application may be integrated into one processing unit, or each of the units may exist alone physically, or at least two units are integrated into one unit. The integrated unit may be implemented in a form of hardware, or may be implemented in a form of a software module unit.

When the integrated unit is implemented in the form of a software module unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, and an optical disc.

A person skilled in the art should be aware that in the one or more examples, functions described in the present invention may be implemented by hardware, software, firmware, or any combination thereof. When the functions described in the embodiments are implemented by software, the foregoing functions may be stored in a computer-readable medium or transmitted as one or more instructions or code in a computer-readable medium. The computer-readable medium includes a computer storage medium and a communications medium, where the communications medium includes any medium that facilitates transmission of a computer program from one place to another. The storage medium may be any available medium accessible to a general-purpose or a dedicated computer.

In the foregoing specific implementations, the objectives, technical solutions, and benefits of the present invention are further described in detail. It should be understood that the foregoing descriptions are merely example implementations of the present invention.

In conclusion, the foregoing embodiments are merely intended to describe the technical solutions of this application, but not to limit this application. Although this application is described in detail with reference to the foregoing embodiments, a person of ordinary skill in the art should understand that the technical solutions described in the foregoing embodiments may still be modified, or some technical features in the technical solutions may be equivalently replaced. These modifications or replacements do not make the essence of the corresponding technical solutions fall outside the scope of the technical solutions of the embodiments of this application.

What is claimed is:

1. A traffic flow processing method, performed by a controller, comprising:

generating and configuring first configuration information for a first edge node, wherein the first edge node is configured to use the first configuration information to: replicate a data packet comprised in a received traffic flow to obtain a first data packet and a second data packet; output, to a first relay node, the obtained first data packet; and output, to a second relay node, the obtained second data packet;

generating and configuring second configuration information for the first relay node, wherein the first relay node is configured to use the second configuration information to: replicate the first data packet to obtain a third data packet and a fourth data packet; output, to the second relay node, the obtained third data packet; and output, to a second edge node, the obtained fourth data packet or a fifth data packet received from the second relay node, whichever is obtained or received first, wherein the fifth data packet is replicated by the second relay node using the second data packet received from the first edge node; and generating and configuring third configuration information for the second edge node, wherein the second edge node is configured to use the third configuration information to obtain a data packet from the first relay node or a data packet from the second relay node, whichever is received first, and the second relay node is not on a link from the first edge node to the second edge node via the first relay node.

2. The method according to claim 1, further comprising:
generating and configuring fourth configuration information for the second relay node, wherein the second relay node is configured to use the fourth configuration information to: replicate the second data packet from the first edge node to obtain the fifth data packet and a sixth data packet; output, to the first relay node, the obtained fifth data packet; and output the obtained sixth data packet or the third data packet received from the first relay node, whichever is obtained or received first.

3. The method according to claim 1, wherein
the first configuration information comprises: a first egress segment identifier of a replication module of the first edge node and a second egress segment identifier of the replication module of the first edge node, wherein the first edge node is configured to use the first egress segment identifier of the replication module of the first edge node to identify a segment from the first edge node to the first relay node, and use the second egress segment identifier of the replication module of the first edge node to identify a segment from the first edge node to the second relay node.

4. The method according to claim 3, wherein
the first configuration information further comprises: a first egress segment label of the replication module of the first edge node and a second egress segment label of the replication module of the first edge node, wherein the first egress segment label of the first edge node corresponds to the segment from the first edge node to the first relay node, and the second egress segment label of the first edge node corresponds to the segment from the first edge node to the second relay node.

5. The method according to claim 1, wherein
the second configuration information comprises: an ingress segment identifier of a replication module of the first relay node, a first egress segment identifier of the replication module of the first relay node, and a second egress segment identifier of the replication module of the first relay node, wherein the first relay node is configured to use the ingress segment identifier of the replication module of the first relay node to identify a segment from the first edge node to the first relay node, use the first egress segment identifier of the replication module of the first relay node to identify a segment from the replication module of the first relay node to an elimination module of the first relay node, and use the second egress segment identifier of the replication module of the first relay node to identify a segment from the first relay node to the second relay node; and
the second configuration information further comprises: a first ingress segment identifier of the elimination module of the first relay node, a second ingress segment identifier of the elimination module of the first relay node, and an egress segment identifier of the elimination module of the first relay node, wherein the first relay node is configured to use the first ingress segment identifier of the elimination module of the first relay node to identify the segment from the replication module of the first relay node to the elimination module of the first relay node, use the second ingress segment identifier of the elimination module of the first relay node to identify a segment from the second relay node to the first relay node, and use the egress segment identifier of the elimination module of the first relay node to identify a segment from the first relay node to the second edge node.

6. The method according to claim 5, wherein
the second configuration information further comprises: an ingress segment label of the replication module of the first relay node, a first egress segment label of the replication module of the first relay node, and a second egress segment label of the replication module of the first relay node, wherein the ingress segment label of the replication module of the first relay node corresponds to the segment from the first edge node to the first relay node, the first egress segment label of the replication module of the first relay node corresponds to the segment from the replication module of the first relay node to the elimination module of the first relay node, and the second egress segment label of the replication module of the first relay node corresponds to the segment from the first relay node to the second relay node; and
the second configuration information further comprises: a first ingress segment label of the elimination module of the first relay node, a second ingress segment label of the elimination module of the first relay node, and an egress segment label of the elimination module of the first relay node, wherein the first ingress segment label of the elimination module of the first relay node corresponds to the segment from the replication module of the first relay node to the elimination module of the first relay node, the second ingress segment label of the elimination module of the first relay node corresponds to the segment from the second relay node to the first relay node, and the egress segment label of the elimination module of the first relay node corresponds to the segment from the first relay node to the second edge node.

7. The method according to claim 1, wherein
the third configuration information comprises: a first ingress segment identifier of an elimination module of the second edge node and a second ingress segment identifier of the elimination module of the second edge node, wherein the second edge node is configured to use the first ingress segment identifier of the elimination module of the second edge node to identify the segment from the first relay node to the second edge node, and use the second ingress segment identifier of the elimination module of the second edge node to identify a segment from the second relay node to the second edge node.

8. The method according to claim 7, wherein
the third configuration information further comprises: a first ingress segment label of the elimination module of the second edge node and a second ingress segment label of the elimination module of the second edge node, wherein the first ingress segment label of the elimination module of the second edge node corresponds to the segment from the first relay node to the second edge node, and the second ingress segment label of the elimination module of the second edge node corresponds to the segment from the second relay node to the second edge node.

9. A traffic flow processing apparatus, used in a controller, comprising:
a processor; and
a non-transitory computer-readable storage medium coupled to the processor and storing programming instructions, that when executed by the processor, instruct the processor to:
generate and configure first configuration information for a first edge node, wherein the first edge node is configured to use the first configuration information to:
replicate a data packet comprised in a received traffic flow to obtain a first data packet and a second data packet; output, to a first relay node, the obtained first data packet; and output, to a second relay node, the obtained second data packet;

generate and configure second configuration information for the first relay node, wherein the first relay node is configured to use the second configuration information to: replicate the first data packet to obtain a third data packet and a fourth data packet; output, to the second relay node, the obtained third data packet; and output, to a second edge node, the obtained fourth data packet or a fifth data packet received from the second relay node, whichever is obtained or received first, wherein the fifth data packet is replicated by the second relay node using the second data packet received from the first edge node; and generate and configure third configuration information for the second edge node, wherein the second edge node is configured to use the third configuration information to obtain a data packet from the first relay node or a data packet from the second relay node, whichever is received first, and the second relay node is not on a link from the first edge node to the second edge node via the first relay node.

10. The apparatus according to claim 9, wherein the programming instructions further instruct the processor to:
generate and configure fourth configuration information for the second relay node, wherein the second relay node is configured to use the fourth configuration information to: replicate the second data packet from the first edge node to obtain the fifth data packet and a sixth data packet; output, to the first relay node, the obtained fifth data packet; and output the obtained sixth data packet or the third data packet received from the first relay node, whichever is obtained or received first.

11. The apparatus according to claim 9, wherein the first configuration information comprises: a first egress segment identifier of a replication module of the first edge node and a second egress segment identifier of the replication module of the first edge node, wherein the first edge node is configured to use the first egress segment identifier of the replication module of the first edge node to identify a segment from the first edge node to the first relay node, and use the second egress segment identifier of the replication module of the first edge node to identify a segment from the first edge node to the second relay node.

12. The apparatus according to claim 11, wherein the first configuration information further comprises: a first egress segment label of the replication module of the first edge node and a second egress segment label of the replication module of the first edge node, wherein the first egress segment label of the first edge node corresponds to the segment from the first edge node to the first relay node, and the second egress segment label of the first edge node corresponds to the segment from the first edge node to the second relay node.

13. The apparatus according to claim 9, wherein the second configuration information comprises: an ingress segment identifier of a replication module of the first relay node, a first egress segment identifier of the replication module of the first relay node, and a second egress segment identifier of the replication module of the first relay node, wherein the first relay node is configured to use the ingress segment identifier of the replication module of the first relay node to identify a segment from the first edge node to the first relay node, use the first egress segment identifier of the replication module of the first relay node to identify a segment from the replication module of the first relay node to an elimination module of the first relay node, and use the second egress segment identifier of the replication module of the first relay node to identify a segment from the first relay node to the second relay node; and the second configuration information further comprises: a first ingress segment identifier of the elimination module of the first relay node, a second ingress segment identifier of the elimination module of the first relay node, and an egress segment identifier of the elimination module of the first relay node, wherein the first relay node is configured to use the first ingress segment identifier of the elimination module of the first relay node to identify the segment from the replication module of the first relay node to the elimination module of the first relay node, is configured to use the second ingress segment identifier of the elimination module of the first relay node to identify a segment from the second relay node to the first relay node, and use the egress segment identifier of the elimination module of the first relay node to identify a segment from the first relay node to the second edge node.

14. The apparatus according to claim 13, wherein the second configuration information further comprises: an ingress segment label of the replication module of the first relay node, a first egress segment label of the replication module of the first relay node, and a second egress segment label of the replication module of the first relay node, wherein the ingress segment label of the replication module of the first relay node corresponds to the segment from the first edge node to the first relay node, the first egress segment label of the replication module of the first relay node corresponds to the segment from the replication module of the first relay node to the elimination module of the first relay node, and the second egress segment label of the replication module of the first relay node corresponds to the segment from the first relay node to the second relay node; and the second configuration information further comprises: a first ingress segment label of the elimination module of the first relay node, a second ingress segment label of the elimination module of the first relay node, and an egress segment label of the elimination module of the first relay node, wherein the first ingress segment label of the elimination module of the first relay node corresponds to the segment from the replication module of the first relay node to the elimination module of the first relay node, the second ingress segment label of the elimination module of the first relay node corresponds to the segment from the second relay node to the first relay node, and the egress segment label of the elimination module of the first relay node corresponds to the segment from the first relay node to the second edge node.

15. The apparatus according to claim 9, wherein the third configuration information comprises: a first ingress segment identifier of an elimination module of the second edge node and a second ingress segment identifier of the elimination module of the second edge node, wherein the second edge node is configured to use the first ingress segment identifier of the elimination module of the second edge node to identify the segment from the first relay node to the second edge node, and use the second ingress segment identifier of the elimination module of the second edge node to identify a segment from the second relay node to the second edge node.

16. The apparatus according to claim 15, wherein the third configuration information further comprises: a first ingress segment label of the elimination module of the second edge node and a second ingress segment label of the elimination module of the second edge node, wherein the first ingress segment label of the elimination module of the second edge node corresponds to the segment from the first relay node to the second edge node, and the second ingress segment label of the elimination module of the second edge node corresponds to the segment from the second relay node to the second edge node.

\* \* \* \* \*

UNITED STATES PATENT AND TRADEMARK OFFICE
CERTIFICATE OF CORRECTION

PATENT NO. : 11,943,148 B2
APPLICATION NO. : 17/243673
DATED : March 26, 2024
INVENTOR(S) : Yuanlong Jiang It is certified that error appears in the above-identified patent and that said Letters Patent is hereby corrected as shown below:

In the Specification

Column 2, Line 30, change "3' packet" to --3$^{rd}$ packet--; and

Column 27, Line 8, change "(ERGs)" to --(EROS)--.

Signed and Sealed this
Thirtieth Day of April, 2024

Katherine Kelly Vidal
*Director of the United States Patent and Trademark Office*